(12) United States Patent
Harviainen et al.

(10) Patent No.: US 11,954,789 B2
(45) Date of Patent: Apr. 9, 2024

(54) SYSTEM AND METHOD FOR SPARSE DISTRIBUTED RENDERING

(71) Applicant: InterDigital VC Holdings, Inc., Wilmington, DE (US)

(72) Inventors: Tatu V. J. Harviainen, Helsinki (FI); Marko Palviainen, Espoo (FI)

(73) Assignee: InterDigital VC Holdings, Inc., Wilmington, DE (US)

( * ) Notice: Subject to any disclaimer, the term of this patent is extended or adjusted under 35 U.S.C. 154(b) by 280 days.

(21) Appl. No.: 17/622,676

(22) PCT Filed: Jul. 2, 2020

(86) PCT No.: PCT/US2020/040724
§ 371 (c)(1),
(2) Date: Dec. 23, 2021

(87) PCT Pub. No.: WO2021/003405
PCT Pub. Date: Jan. 7, 2021

(65) Prior Publication Data
US 2022/0351456 A1 Nov. 3, 2022

Related U.S. Application Data

(60) Provisional application No. 62/869,832, filed on Jul. 2, 2019.

(51) Int. Cl.
*G06T 15/06* (2011.01)
*G06T 17/20* (2006.01)
*G06T 19/20* (2011.01)

(52) U.S. Cl.
CPC .............. *G06T 15/06* (2013.01); *G06T 17/20* (2013.01); *G06T 19/20* (2013.01);
(Continued)

(58) Field of Classification Search
CPC ......... G06T 15/06; G06T 17/20; G06T 19/20; G06T 2200/16; G06T 2210/56;
(Continued)

(56) References Cited

U.S. PATENT DOCUMENTS 5,655,085 A 8/1997 Ryan
5,794,207 A 8/1998 Walker
(Continued)

FOREIGN PATENT DOCUMENTS

| CN | 104679235 | 6/2015 |
|---|---|---|
| EP | 2966863 | 1/2016 |
| EP | 3467784 A1 | 4/2019 |

OTHER PUBLICATIONS

International Search Report and Written Opinion of the International Searching Authority for PCT/US2020/040724 dated Jul. 2, 2020 (10 pages).
(Continued)

*Primary Examiner* — Jitesh Patel
(74) *Attorney, Agent, or Firm* — Klintworth & Rozenblat IP LLP

(57) ABSTRACT

Systems and methods are described for rendering a 3D synthetic scene. A display client receives point cloud samples of the scene, where the point cloud samples include a point location, one or more viewing directions, and color information for each of the viewing directions. The point cloud samples may be generated by a server using ray tracing. The display client combines information from the point cloud samples with a locally generated rendering of at least a portion of the scene to generate a combined rendering of the scene, and the client displays the combined rendering. The number of point cloud samples may be adjusted adaptively based on performance metrics at the client.

18 Claims, 17 Drawing Sheets

(52) U.S. Cl.
CPC ...... *G06T 2200/16* (2013.01); *G06T 2210/56* (2013.01); *G06T 2219/2012* (2013.01)

(58) Field of Classification Search
CPC . G06T 2219/2012; G06T 15/20; G06F 3/011; G06F 3/012; G06F 3/013; G06F 3/1407
See application file for complete search history.

(56) References Cited

U.S. PATENT DOCUMENTS

| | | | |
|---|---|---|---|
| 5,818,955 | A | 10/1998 | Smithies |
| 2014/0233800 | A1 | 8/2014 | Kis |
| 2015/0146269 | A1 | 5/2015 | Lee |
| 2017/0154463 | A1 | 6/2017 | Von Cramon |
| 2017/0169602 | A1 | 6/2017 | Blackmon |
| 2017/0263052 | A1 | 9/2017 | Turner |
| 2017/0287446 | A1 | 10/2017 | Young |
| 2018/0061117 | A1 | 3/2018 | Pohl |
| 2018/0165799 | A1 | 6/2018 | Pohl |
| 2018/0225866 | A1* | 8/2018 | Zhang ............ G06T 7/593 |
| 2018/0276790 | A1 | 9/2018 | Mantor |
| 2018/0329485 | A1 | 11/2018 | Carothers |
| 2019/0034731 | A1 | 1/2019 | Lee |
| 2019/0065761 | A1 | 2/2019 | Anderson |
| 2019/0088004 | A1* | 3/2019 | Lucas ............ G06T 19/20 |
| 2021/0248752 | A1* | 8/2021 | Doemling ......... G06T 7/187 |

OTHER PUBLICATIONS

International Preliminary Report on Patentability for PCT/US2020/040724 dated Dec. 28, 2021 (7 pages).

Wikipedia, "Turing (microarchitecture)" as of Dec. 12, 2018, retrieved from https://web.archive.org/web/20181212122428/https://en.wikipedia.org/wiki/Turing_(microarchitecture) 3 pages.

Chaitanya, C. R., et al., "Interactive reconstruction of Monte Carlo image sequences using a recurrent denoising autoencoder." ACM Transactions on Graphics (TOG) vol. 36, No. 4. Jul. 2017 (12 pages).

Orts-Escolano, S., et al. "Point cloud data filtering and downsampling using growing neural gas." In the 2013 International Joint Conference on Neural Networks (IJCNN), IEEE, Aug. 2013 pp. 1-8 (8 pages).

Vitanen, T., et al., "Sparse Sampling for Real-time Ray Tracing." In Proceedings of the 13th International Joint Conference on Computer Vision, Imaging and Computer Graphics Theory and Applications (VISIGRAPP 2018), 2018 pp. 295-302, (8 pages).

Oburu, I. "Lazertouch World's First Mini Projector Transforms any Surface into Finger Activated Touchscreen", Press releases in Display Daily, May 12, 2016, last accessed on Feb. 22, 2023, https://displaydaily.com/lazertouch-world-s-first-mini-projector-transforms-any-surface-into-finger-activated-touchscreen/ (6 pages).

Voida, S., et al., "A Study on the Manipulation of 2D Objects in a Projector/Camera-Based Augmented Reality Environment." In Proceedings of the SIGCHI conference on Human factors in computing systems, 2005, pp. 611-620 (10 pages).

Kara, P. A., et al. "The interdependence of spatial and angular resolution in the quality of experience of light field visualization." In 2017 International Conference on 3D Immersion (IC3D), IEEE, 2017 (8 pages).

Kovács, P. T., et al. "Architectures and codecs for real-time light field streaming." J. Imaging Sci. Technol. 010403, 2017 (13 pages).

Kovács, P. T., et al. "Overview of the applicability of H. 264/MVC for real-time light-field applications." In 2014 3DTV-Conference: The True Vision-Capture, Transmission and Display of 3D Video (3DTV-CON), IEEE, 2014 (4 pages).

Geng, J., "Three-dimensional display technologies." Advances in optics and photonics 5, No. 4, 2013, pp. 456-535 (80 pages).

Yilmaz, A., et. "Object tracking: A survey." Acm computing surveys (CSUR) vol. 38, No. 4, article 13, Dec. 2006 (45 pages).

Azuma, R. T., "A survey of augmented reality" In Presence Teleoperators Virtual Environments 6 vol. Aug. 4, 1997, pp. 355-385 (48 pages).

Funes, M., et al. "Eyediap: A database for the development and evaluation of gaze estimation algorithms from rgb and rgb-d cameras." In Proceedings of the Symposium on Eye Tracking Research and Applications, 2014 (4 pages).

Silberman, N., et al. "Indoor Segmentation and Support Inference From RGBD Images." In: European Conference on Computer Vision, 2012 (14 pages).

Deisinger, J., et al. "Double Exponential Smoothing: An Alternative to Kalman Filter-Based Predictive Tracking." Eurographics Workshop on Virtual Environments, 2003 (8 pages).

Ehnes, J., et al. Projected Augmentation-Augmented Reality using Rotatable Video Projectors. In: Proceedings of the 3rd IEEE and ACM International Symposium on Mixed and Augmented Reality. IEEE Computer Society, 2004. pp. 26-35 (10 pages).

Zhang, Y., et al. "An extended self-adaptive Kalman filtering object motion prediction model" In: Intelligent Information Hiding and Multimedia Signal Processing, 2008. IIHMSP'08 International Conference on. IEEE, 2008, pp. 421-424 (4 pages).

Kiruluta, A., et al. "Predictive head movement tracking using a Kalman filter" IEEE Transactions on Systems, Man, and Cybernetics, Part B (Cybernetics), vol. 27 No. 2 Apr. 1997, p. 326-331 (6 pages).

La Cascia, M., et al. "Fast, Reliable Head Tracking Under Varying Illumination: An Approach Based on Registration of Texture-Mapped 3D Models" IEEE Transactions on Pattern Analysis and Machine Intelligence, vol. 22 No. 4, pp. 322-336, Apr. 2000, (15 pages).

* cited by examiner

SYSTEM AND METHOD FOR SPARSE DISTRIBUTED RENDERING

CROSS-REFERENCE TO RELATED APPLICATIONS

The present application is a national stage application under 35 U.S.C. § 371 of International Application No. PCT/US2020/040724, entitled "SYSTEM AND METHOD FOR SPARSE DISTRIBUTED RENDERING," filed on Jul. 2, 2020, which claims benefit under 35 U.S.C. § 119(e) from U.S. Provisional Patent Application Ser. No. 62/869,832, entitled "SYSTEM AND METHOD FOR SPARSE DISTRIBUTED RENDERING," filed Jul. 2, 2019, which is hereby incorporated by reference in its entirety.

BACKGROUND

For untethered head-mounted displays (HMDs), it can be useful for more of the computing to be performed by the HMD itself rather than external devices. Similarly, it may be desirable for goggleless 3D displays to perform a greater amount of content processing. In both cases, depending on the viewer location and gaze direction, rendering a full view at a uniformly high sample density can produce huge amount of data, not all of which may be useful in improving perceptual quality.

High quality rendering with ray tracing may call for graphics processing performance only currently delivered by high end desktop computers with dedicated graphics cards. As more of the display specific rendering is more closely integrated with the displays, for example in untethered HMDs and light field displays, novel rendering solutions may enable higher image quality also in cases when device rendering is performed with less powerful computing platforms such as mobile system-on-a-chip (SoC) processors.

Autostereoscopic displays such as light field displays are capable of allowing the human eyes to see spatial information without the necessity of wearing special glasses. Light field displays can provide 3D images with a continuous motion parallax on a wide viewing zone. A visualized light field can be perceived in a given range of angles measured from the direction of the screen, known as the Field of View (FOV). There exist following kinds of light field displays:

Super-multiview light field displays—A light field display may be a super-multiview display that does not provide variable focus control but is capable of providing multiple views to pupils simultaneously that may help to evoke the natural accommodation responses to reduce the accommodation—convergence conflict, and to provide smooth motion parallax.

Variable focus control light field displays—A light field display may be a multi-focal display that is capable of generating images at different depth positions.

Augmented Reality (AR) allows the user to see the real world, with virtual objects superimposed upon or composited with the real world. Therefore, AR supplements reality, rather than completely replacing it. In addition, 3D viewing experiences which exploit AR content typically call for the use of Head-Mounted Displays (HMDs). It would be desirable in some cases to implement projector-based solutions that support use of AR content without requiring a headset. However, there are limitations in projector-based AR solutions. For example, a projector cannot typically project visual content for viewers in opposite directions. Instead, the orientation of the projector must generally be changed for projecting images to opposite viewing directions. Similarly the projector relies on a surface to project on and is generally limited to 2D object representation on such surfaces.

SUMMARY

A method according to some embodiments includes: receiving from a server a plurality of point cloud samples of a synthetic 3D scene, the point cloud samples including (i) a point location, (ii) at least one viewing direction, and (iii) color information for each of the viewing directions; based on a viewpoint position, obtaining a first set of color samples from the point cloud samples; based on the viewpoint position, rendering at least a portion of a locally-stored copy of the synthetic 3D scene to produce a second set of color samples; and causing display of the synthetic 3D scene using the first and second sets of color samples.

In some embodiments, the method further includes combining the first set of color samples and the second set of color samples to generate a combined set of color samples, wherein causing display of the synthetic 3D scene comprises causing display of the combined set of color samples. Some embodiments further include de-noising the combined set of color samples. In some embodiments, causing display of the color samples may be performed by actually displaying the color samples; in other embodiments, causing display of the color samples may be performed by sending video data representing the color samples to a separate display device for display.

In some embodiments, the method further includes signaling to the server a requested sampling density, wherein the point cloud samples are received with the requested sampling density. In some embodiments, the requested sampling density is based on a processing time for rendering the locally stored copy of the synthetic 3D scene.

A method according to some embodiments includes: generating a plurality of point cloud samples of a synthetic 3D scene, each of the point cloud samples having (i) a point location, (ii) at least one viewing direction, and (iii) color information for each of the viewing directions; wherein the point cloud samples are generated by a method comprising: selecting a point cloud location on a surface in the 3D scene; and for each at least one viewing direction, performing ray tracing in the 3D scene to determine color information for the respective viewing direction. The method further includes sending the point cloud samples to a client.

Some embodiments further include receiving a requested sample density from the client, wherein the point cloud samples are generated with the requested sample density.

In some embodiments, a number of viewing directions for a point cloud sample is based at least in part on a level of diffuseness of reflection at the corresponding surface, with the number of viewing directions being decreased for increasing diffuseness.

Some embodiments further include receiving from the client information indicating a viewpoint position, wherein the viewing directions are selected based on the viewpoint position.

An apparatus according to some embodiments includes a processor configured to perform at least: receiving from a server a plurality of point cloud samples of a synthetic 3D scene, the point cloud samples including (i) a point location, (ii) at least one viewing direction, and (iii) color information for each of the viewing directions; based on a viewpoint position, obtaining a first set of color samples from the point cloud samples; based on the viewpoint position, rendering at least a portion of a locally-stored copy of the synthetic 3D scene to produce a second set of color samples; and causing display of the synthetic 3D scene using the first and second sets of color samples.

In some embodiments, the processor is further configured to combine the first set of color samples and the second set of color samples to generate a combined set of color samples; wherein causing display of the synthetic 3D scene comprises causing display of the combined set of color samples.

In some embodiments, the processor is further configured to perform: selecting a requested sampling density based on a processing time for rendering the locally-stored copy of the synthetic 3D scene; and signaling to the server the requested sampling density; wherein the point cloud samples are received with the requested sampling density.

An apparatus according to some embodiments includes a processor configured to perform at least: generating a plurality of point cloud samples of a synthetic 3D scene, each of the point cloud samples having (i) a point location, (ii) at least one viewing direction, and (iii) color information for each of the viewing directions; wherein the point cloud samples are generated by a method comprising: selecting a point cloud location on a surface in the 3D scene; and for each at least one viewing direction, performing ray tracing in the 3D scene to determine color information for the respective viewing direction. The point cloud samples are sent to a client.

In some embodiments, the processor is further configured to receive a requested sample density from the client, wherein the point cloud samples are generated with the requested sample density.

In some embodiments, a number of viewing directions for a point cloud sample is based at least in part on a level of diffuseness of reflection at the corresponding surface, with the number of viewing directions being decreased for increasing diffuseness.

Some embodiments enable a viewing client, which may be for example a display device with local processing, and content server, which may be for example wirelessly connected desktop computer, to share the workload of real-time ray tracing.

In some example systems and methods described herein, the server produces a sparse collection of ray traced samples by varying the viewing direction per sample according to the material characteristics of the content. Each sample is a point with color information for varying number of viewing directions. A number of viewing directions of each sample point is determined by the content server according to the material characteristics and variation of the viewing direction desired by the client. Clients may synthesize novel viewpoints by projecting the samples to a novel viewpoint. Clients may steer the sampling density and distribution of the content server and combine local rendering to increase sampling density and to fill sampling gaps as appropriate.

Some embodiments provide systems and methods supporting preparation of light field visualizations for the physical objects of interest in a tracked or in a predicted viewing environment of a light field display. Some such methods and systems support displaying light field visualizations for physical objects of interest in correct positions, orientations, and depth distances for the viewers of a light field display.

DETAILED DESCRIPTION

A detailed description of illustrative embodiments will now be provided with reference to the various figures. Although this description provides detailed examples of possible implementations, it should be noted that the provided details are intended to be by way of example and in no way limit the scope of the application.

Example Networks for Implementation of the Embodiments

Figure 1A:
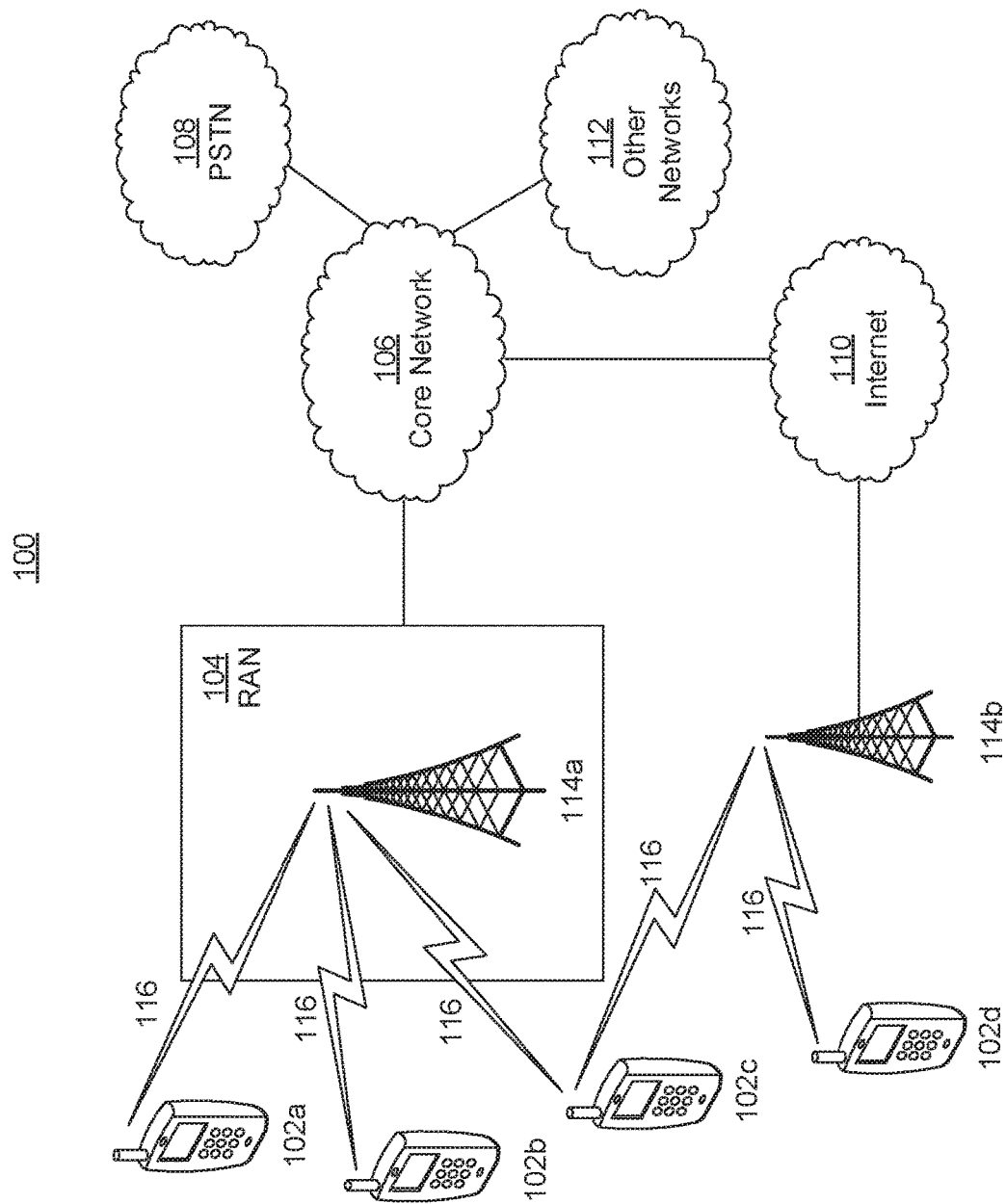
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
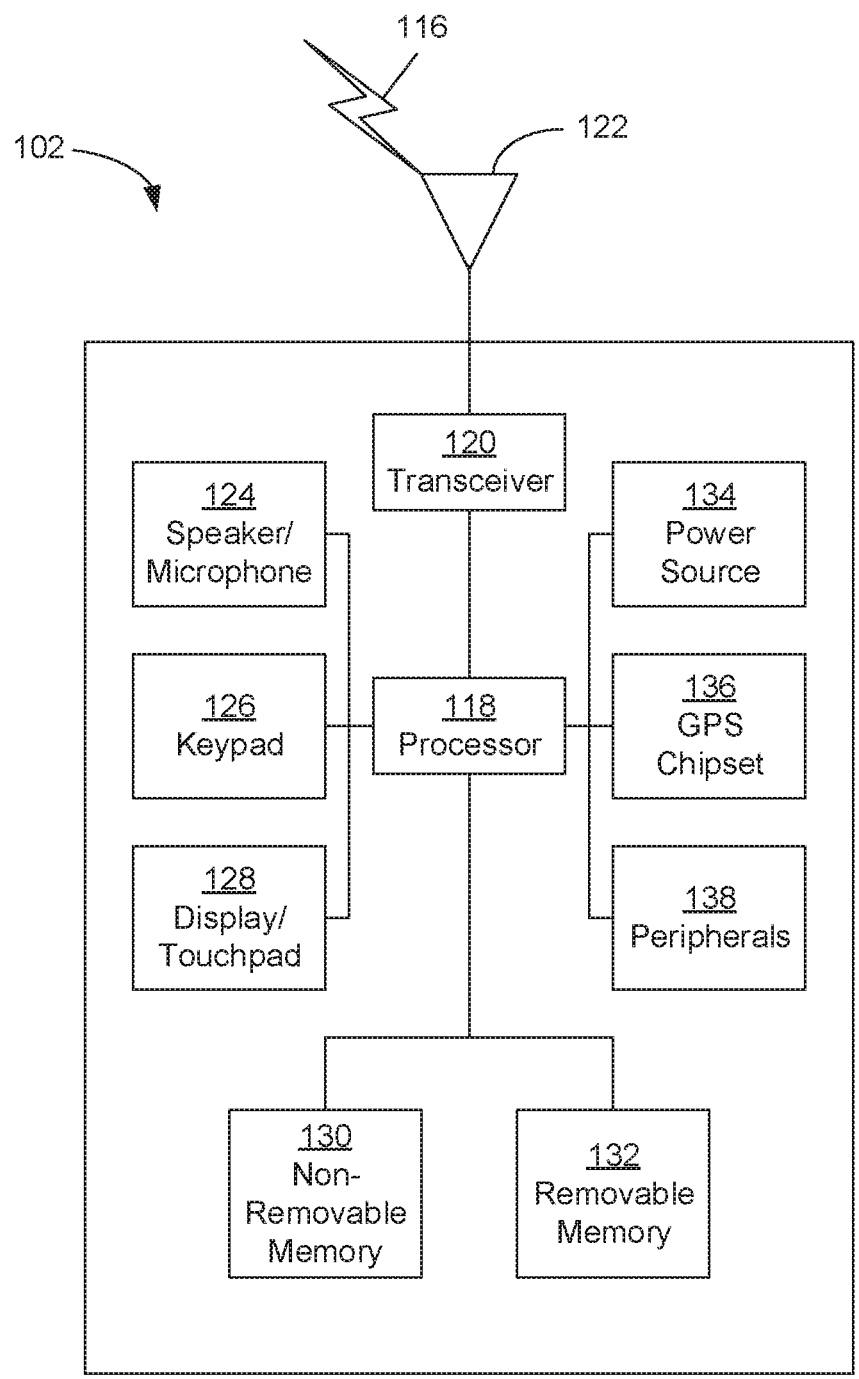
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

In view of FIGS. 1A-1B, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Sparse Distributed Rendering

Overview of Some Embodiments.

For real-time immersive experiences to achieve a high level of visual fidelity (e.g. at the same level as seen in feature films), it may be desirable for the real-time rendering paradigm to shift from rasterization to ray tracing. In ray tracing, the number of individual ray samples that must be calculated to produce an individual image, even when used in combination with the state-of-the-art deep learning based denoising methods, is incredibly large. Even with the dedicated ray tracing cores embedded with the GPU, ray tracing alone may be inadequate for rendering complex scenes.

Single computing units alone may be inadequate to render complex scenes with ray tracing in real-time. Latency issues generally prohibit distributed rendering in real-time rendering use cases. Content distribution bandwidth limitations generally prohibit free viewpoint rendering with full high-resolution light fields to mitigate latency.

Some embodiments disclosed herein enable realistic rendering of visually rich synthetic scenes by enabling distributed ray traced rendering between viewing client and content server. In some such embodiments, visual content is distributed from the content server to the viewing client in a point sample format, where the sample density and viewpoint are controlled by the viewing client and available resources. A point sample format used for distribution may feature viewpoint-dependent visual features in a format that enables viewpoint adjustment at the viewing client side.

In some embodiments, the viewing client is a display with significant computing and graphics processing capabilities. Both the content server and viewing client have the same full content in a native 3D format, but rendering performance of the viewing client alone may not be enough to render photorealistic ray traced images from the content. By harnessing processing power available at the content server side for assisting in the rendering, the combined rendering performance is sufficient to allow high-resolution rendering of the content using ray tracing.

Figure 2A:
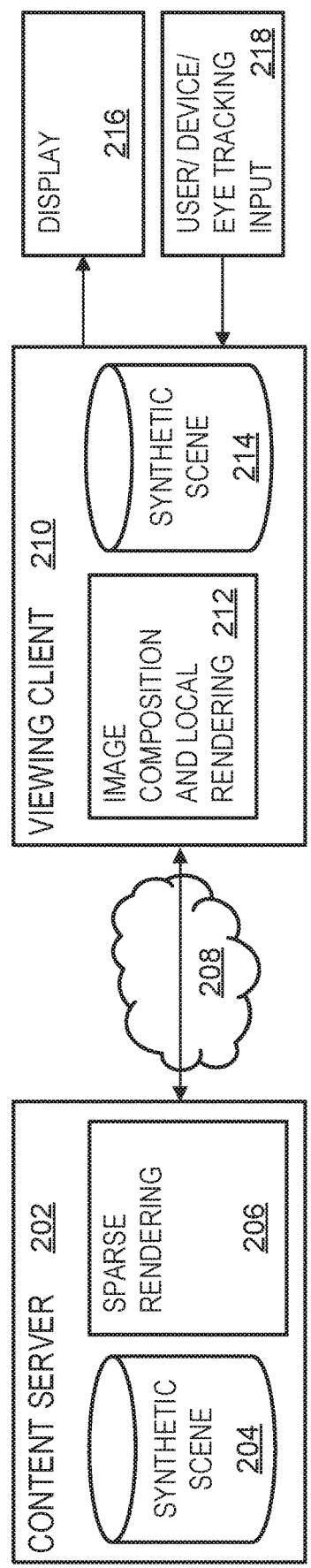
FIG. 2A illustrates components used in some embodiments.

FIG. 2A illustrates components used in some embodiments. As shown in the figure, content server 202 comprises synthetic scene 204 and performs sparse rendering 206. Data can be transferred between viewing client content server 202 and viewing client 210 via wireless connection 208. Viewing client 210 includes synthetic scene 2014 and performs image and local rendering 212. Viewing client may receive input 218 from the user, device, or eye tracking. Images processed by the system are displayed at display 216. In some embodiments, one or more of the modules 216 and 218 are components of the viewing client 210.

Figure 2B:
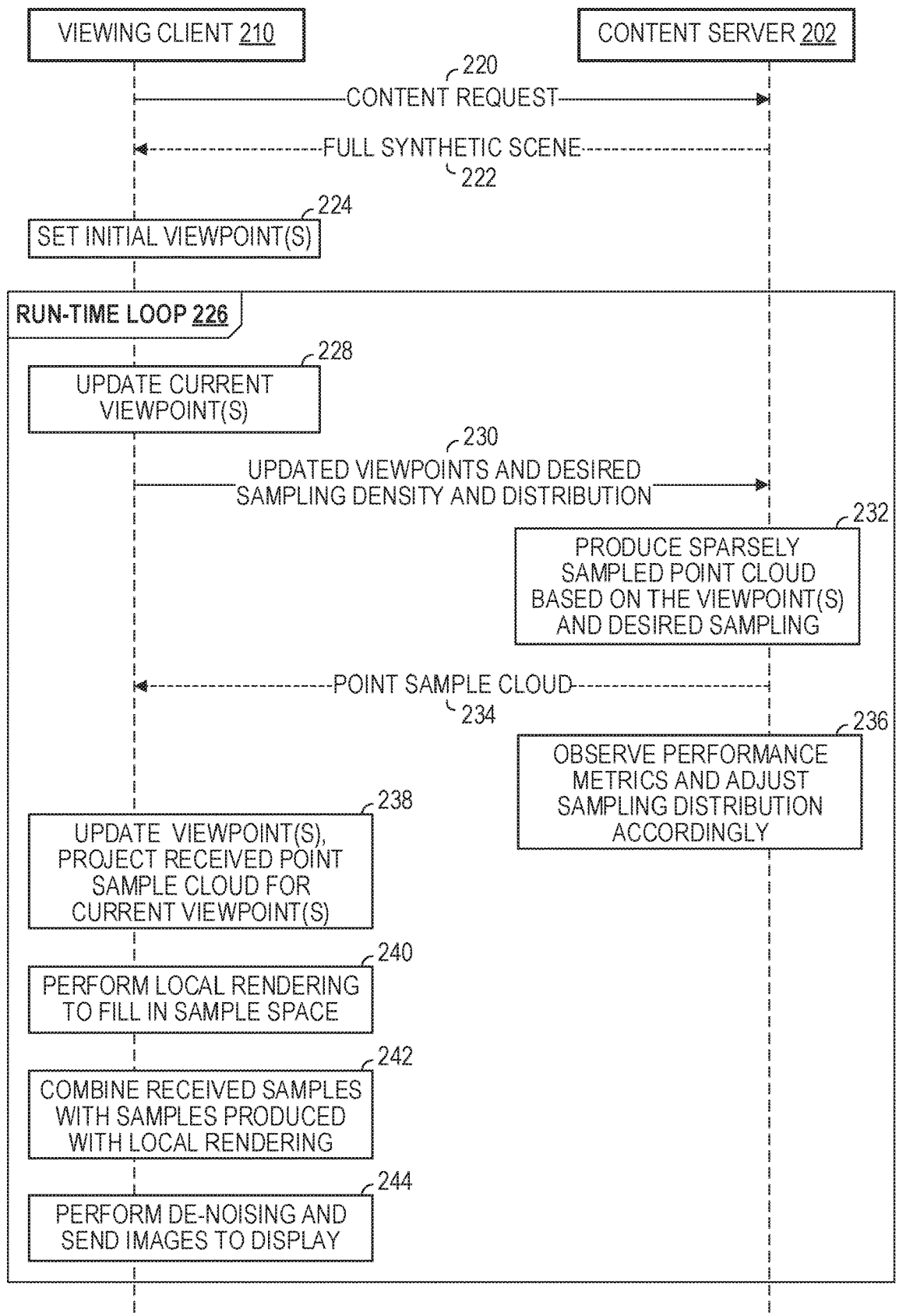
FIG. 2B is a message flow diagram illustrating an example method performed in some embodiments.

FIG. 2B illustrates the sequence of communication between main entities in an example use session in accordance with at least one embodiment. In the example, a content server (such as content server 202 shown in FIG. 2A) performs the following actions. At 220, a content request is received from the viewing client (e.g. viewing client 210). At 222, a full synthetic scene (e.g., full 3D content) is sent to the client. At 230, viewpoint(s) and sample distribution specifications are received from the viewing client. At 232, a sparsely sampled point sample cloud is produced from the content based on the viewpoint(s) and the requested sample density. A 234, the data (e.g. a point sample cloud) is submitted to the viewing client. At 236, performance metrics are observed and sampling density is adjusted accordingly. If an end of processing has not been signaled, the process may return to element 232 described above. In the example of FIG. 2A, a viewing client (such as viewing client 210 shown in FIG. 2A) performs the following actions. At 220, content is requested from the content server. Device and gaze tracking may be initialized. At 222, a full synthetic scene (e.g. full 3D content) is received. At 224, initial viewpoint(s) are set. At 228, the current viewpoint(s) are updated based on user input and device tracking. At 230, the current viewpoint(s) and desired sample density are communicated to the content server. At 234, a sparse point sample cloud is received from the content server. At 238, the viewpoint(s) are updated, and the sparse point sample cloud is projected to the current viewpoint(s). A user fovea area may be updated based on eye tracking. Gaps in the sparse sampling caused by motion parallax may be detected. A depth map may be produced, and occluded sample points may be discarded. At 240, local rendering may be performed to fill the gaps. Local rendering may be performed based on the gaps caused by the motion parallax and local sampling importance (e.g. determined by user input and/or eye tracking). Dense sampling from the full 3D content for the fovea area may be performed. At 242, received samples are combined with samples produced by local rendering. At 244, the image buffer combining the sparse sampled peripheral and dense sampled fovea areas is de-noised, and the image is sent for display. If an end of processing has not been signaled, the process may return to element 228 described above.

Some example methods enable the content server and viewing client to balance the rendering effort, e.g. by dynamically adjusting distribution of processing tasks to meet processing and data distribution limits. Some embodiments enable the high image quality of real-time ray tracing to be delivered by sharing rendering tasks between the display and a wirelessly connected rendering server.

Content Server

Figure 3:
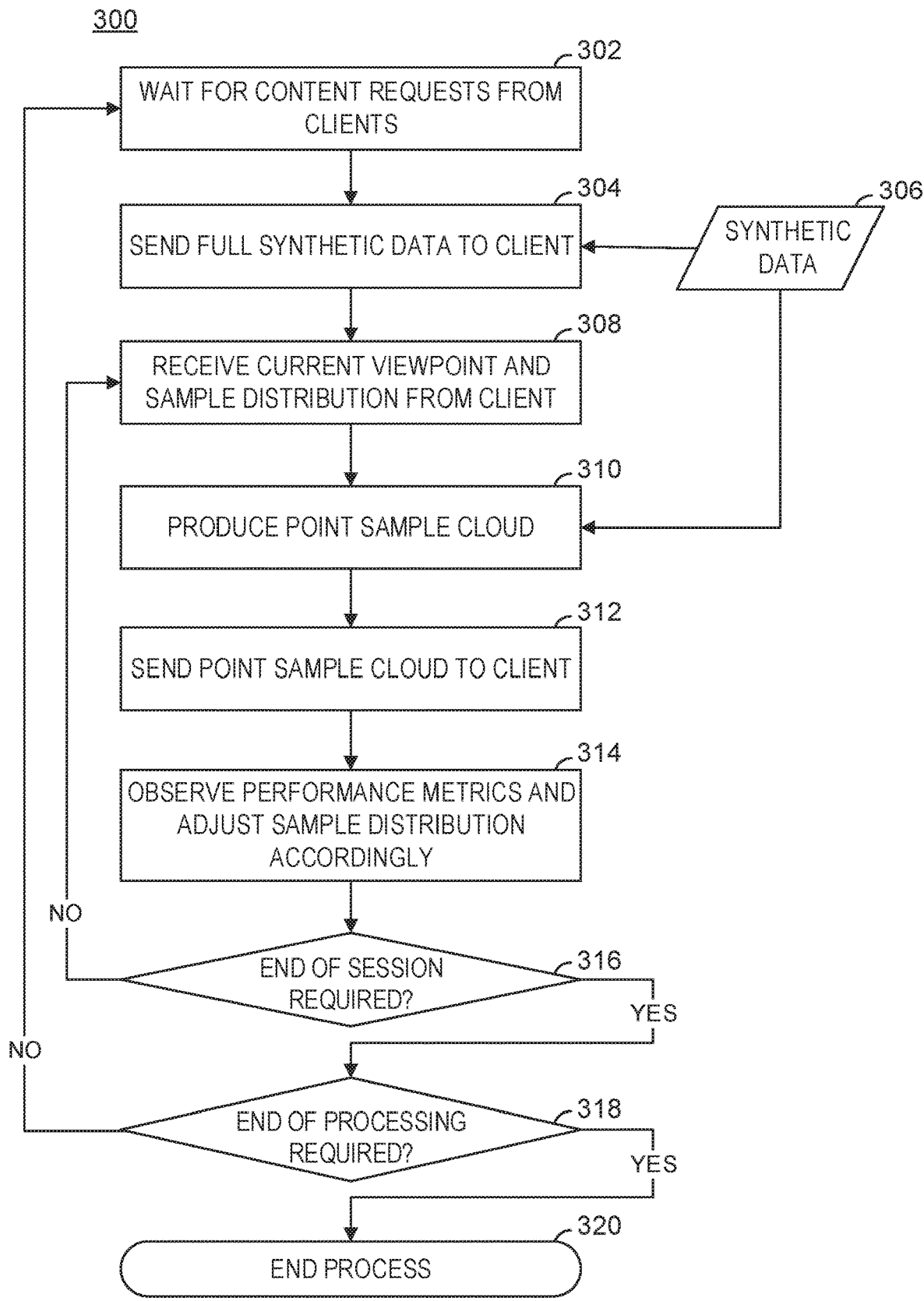
FIG. 3 illustrates an example method performed by a content server in some embodiments.

FIG. 3 illustrates an example process 300 executed by a content server. At 302, the server waits for content requests from clients. A request from a viewing client for specific content may be received. Initially, at 304, the content server sends synthetic data 306 (e.g. the full synthetic scene) to the viewing client. The viewing client uses user input and/or eye tracking to determine the user viewpoint and signals it to the content server (e.g., once the content display has begun). In addition to the client viewpoint, the client signals a desired sample distribution which conveys the angular resolution and angular sector the client wants the server to render sparse point cloud from.

After receiving (308) the current viewpoint and sample distribution from the client, the content server produces (e.g. renders) the point cloud data based on the viewpoint and sample distribution requested by the client. The point sample cloud may be produced in a sparse variable viewpoint format, as explained in detail below. At 312, the content server sends the data to the viewing client.

During rendering and data transmission, the content server observes (312) performance metrics (such as the processing time it takes to render point cloud data in requested format as well as data communication performance) and adjusts the sample distribution accordingly. For example, if rendering or data transfer exceeds threshold time set as a budget available for single frame, the server may reduce the angular and spatial resolution of the point cloud rendering. This balances the workload between server and client such that the rendering by the server or the data transfer bandwidth between server and the client does not become a bottleneck. At 316 the content server checks for a signal of an end of session. At 318 the content server checks for a signal to end processing.

Sparse Rendering with Variable Viewpoints

In some embodiments, the server produces a point cloud representation of the synthetic scene by sparsely sampling the scene using ray tracing from a client-requested viewpoint and using a client-requested sample density. In addition to the spatial sample density from a single viewpoint, the client may request a specific angular resolution and angular viewpoint distribution around the main viewpoint to be used. This enables client to update the viewpoint to mitigate the latency caused by the distributed rendering and data transfer. Furthermore, desired angular resolution and distribution of viewpoints may be specific to the capabilities of the particular client display device, for example in cases when the client is a light field display.

Figure 4:
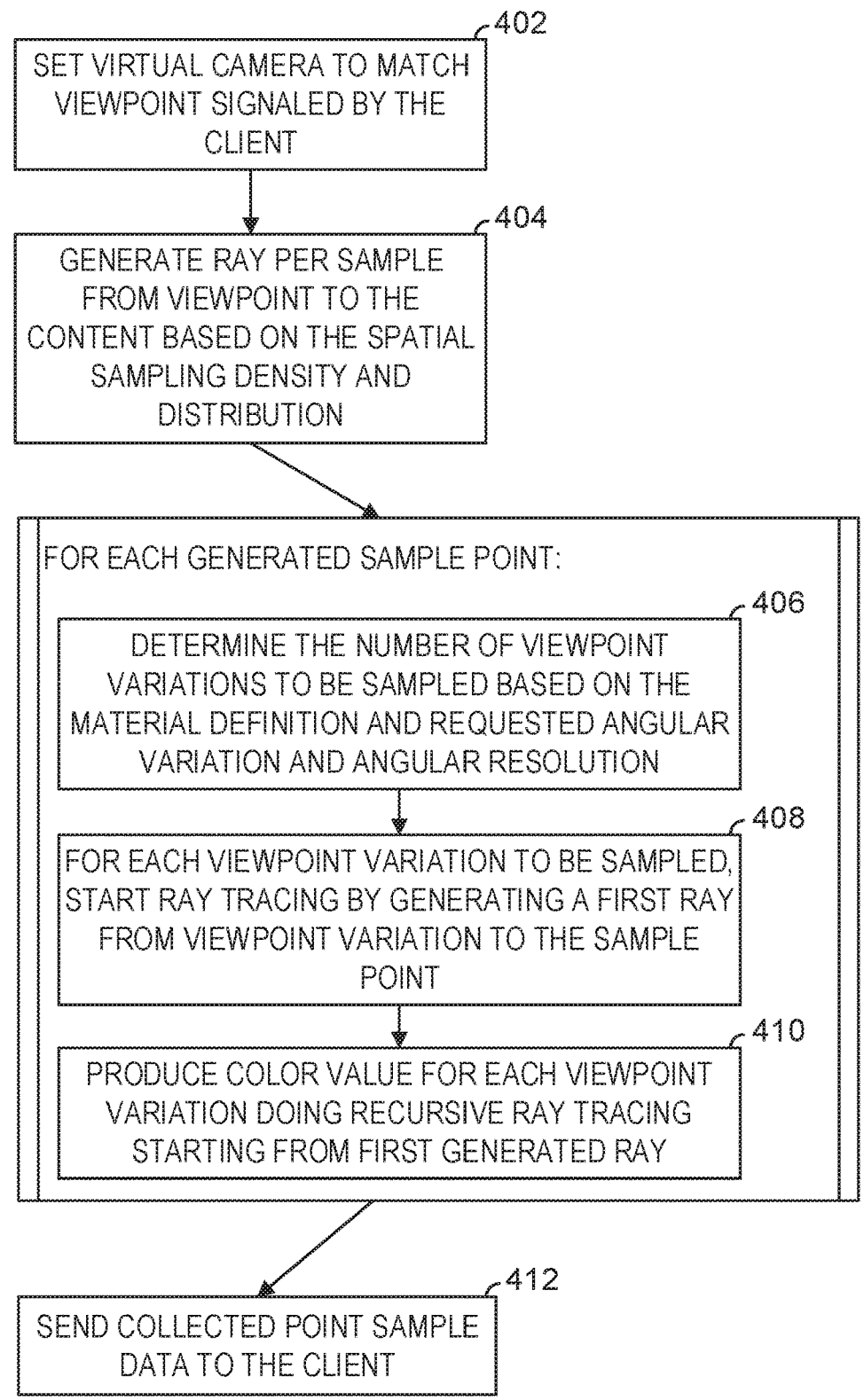
FIG. 4 illustrates an example sparse rendering process performed by a server in some embodiments.

FIG. 4 illustrates an example sparse rendering process performed by a server in some embodiments. In the example, the rendering process is executed based on the viewpoint and sample density signaled by the client. The example rendering process has a target frame rate, and a sparse rendering process is executed once for each time step that has a duration to match the desired frame rate. In the beginning of a single rendering step, the server sets (402) the virtual camera to the scene to match the viewpoint signaled by the client. Using the viewpoint, the server generates (404) initial rays per sample (from viewpoint to the content) by using the sampling distribution requested by the client. The sampling distribution request identifies the field of view to be sampled from the viewpoint, spatial resolution, distribution of the spatial resolution, angular variation of the viewpoint, and angular resolution. For each generated sample point, the server determines (406) a number of viewpoint variations to be sampled based on the information from the sampling distribution request. The number of viewpoint variations may also be based on a material definition associated with the sample point. For each viewpoint variation to be sampled, the content server starts ray tracing by generating (408) a first ray from the particular viewpoint variation to the sample point. The content server produces (410) a color value for each viewpoint variation by recursively ray tracing, starting from the first generated ray.

Figure 5:
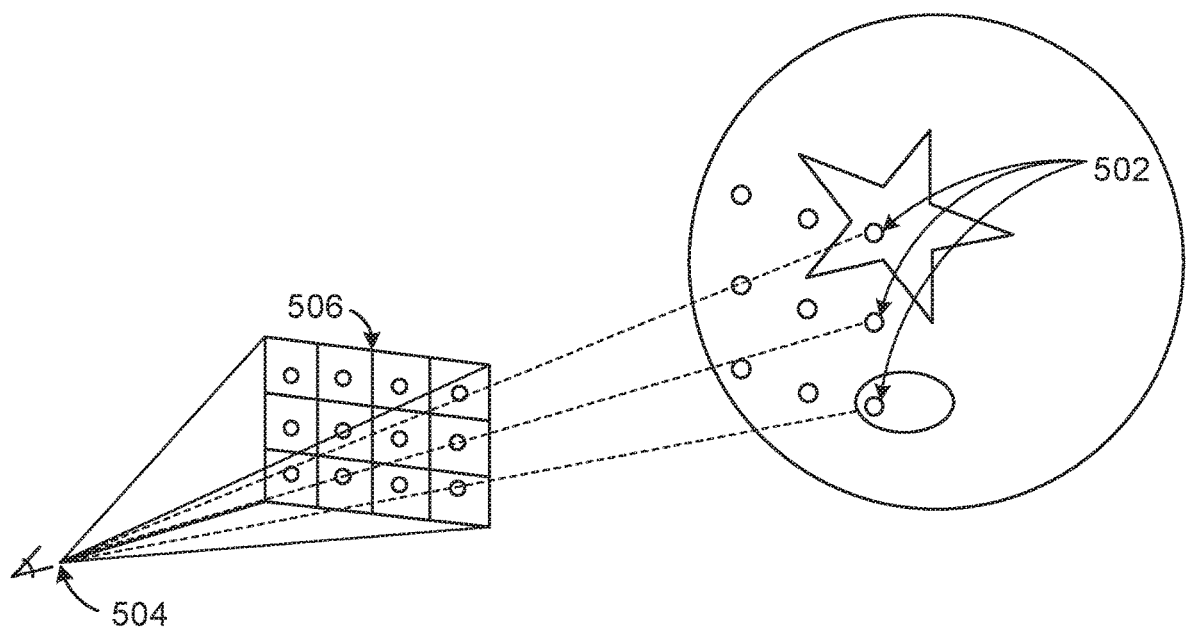
FIG. 5 is a schematic illustration of a portion of a sparse rendering process in which surface sample points are determined.

FIG. 5 is a schematic illustration of a portion of a sparse rendering process in which surface sample points are determined. The example illustrates a server generating a number of sample points 502 based on the viewpoint 504 and sample density requested by the client. The requested sample density is illustrated by the resolution of the grid 506.

Tracing the rays to the closest hit point determines the object and surface point each ray hits. From the object and surface point, the process determines the material characteristics of that specific sample point. Based on the material, the process may determine how much angular variation of the viewpoint causes the material appearance to change. The server may operate to determine a number of sample directions to be generated for each sample point based on i) information regarding how the material appearance changes over the viewpoint location and ii) the angular area to be covered and angular resolution as requested by the client.

Figure 6:
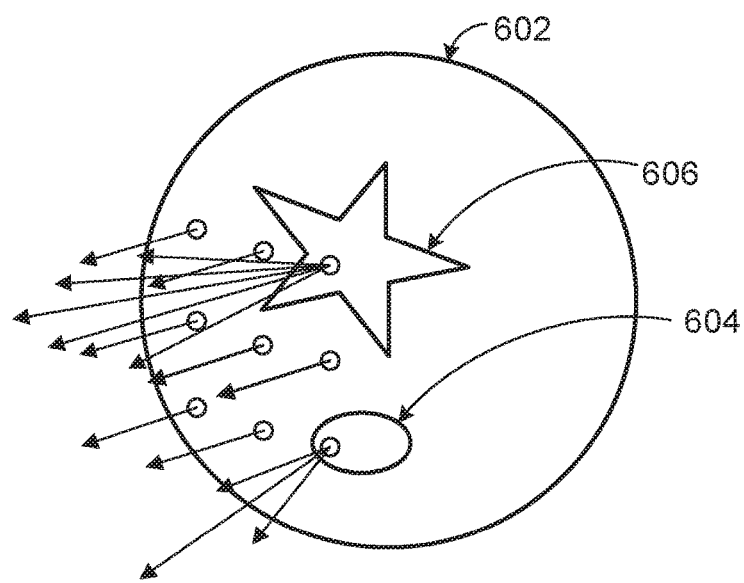
FIG. 6 is a schematic illustration of a determination of viewpoint variations to be sampled based on sample point material and client request.

FIG. 6 is a schematic illustration of a determination of viewpoint variations to be sampled based on sample point material and client request. The exemplary illustration shows an outcome of a process of determining, per sample point material and requested angular area and angular resolution, how many viewpoint variations a sample point should have. In the exemplary illustration, most of the sphere 602 is of material with nearly perfect Lambertian reflection, which produces a diffuse reflection to all directions for the incoming light. For such a material, a single sample direction is enough as viewpoint variation does not have an impact on the sample point appearance. The illustrated smaller elliptic area 604 on the material features glossy reflective material for which sparse angular resolution of viewpoint variation is enough to produce good estimation as interpolation between sparsely distributed viewpoint directions gives good approximation of the actual appearance. The illustrated star-shaped surface area 606 features mirror reflection, calling for dense angular sampling as viewpoint angle has a high impact on the sample point appearance. In summary, the angular sampling density of the data returned to the client may vary between locations as determined by the server, based on material characteristics defined in the high-resolution model representation. Once the sample points and angular sampling density has been defined for the sample points, each sampling direction is regarded as a viewpoint and a recursive ray tracing is initiated using a ray from the view direction to the sample point as the initial ray.

Figure 7:
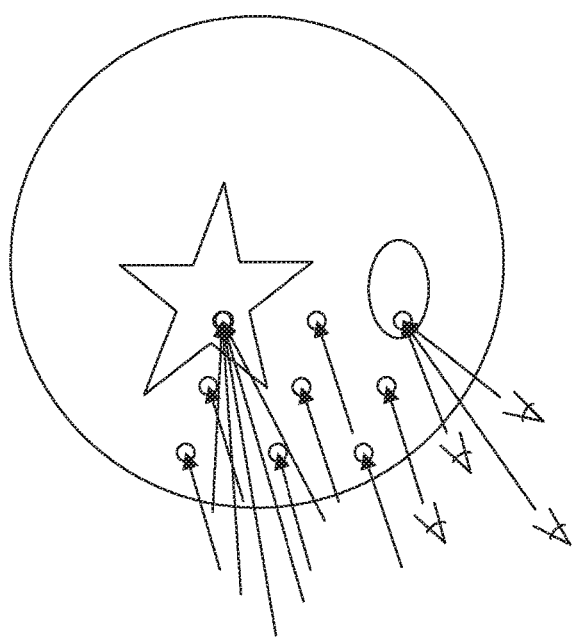
FIG. 7 is a schematic illustration of a process of generating initial rays from the determined viewpoints for each sample point.

FIG. 7 is a schematic illustration of a process of generating initial rays from the determined viewpoints for each sample point. For each of the rays, a full recursive ray tracing may be performed, as new rays spawn from the sample point on the elliptic surface area of the sphere.

Figure 8:
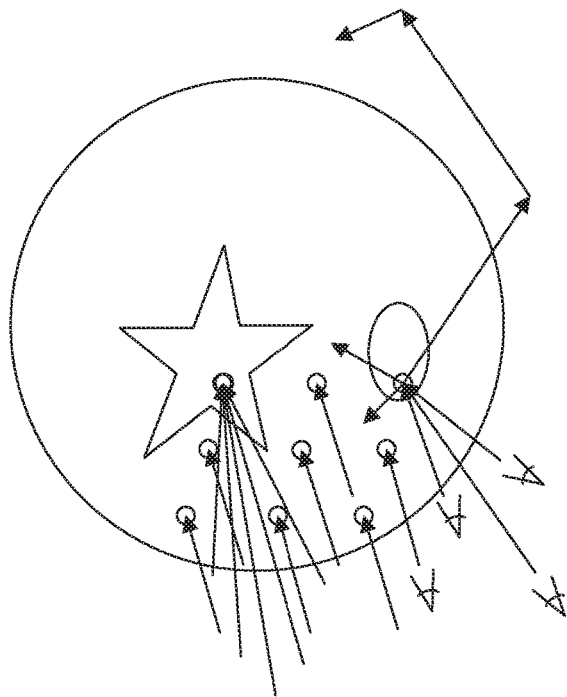
FIG. 8 is a schematic illustration of recursive ray tracing using the initial rays.

FIG. 8 is a schematic illustration of recursive ray tracing using the initial rays. Once the recursive ray tracing has reached maximum depth of recursion steps or further bounces of rays have a negligible impact on the final sample point appearance due to the energy absorption taking place in the ray travel, the ray tracing results are summed as the final appearance of the sample point. In this case, the resulting sample point values from various viewpoint directions are collected as multiple values for the sample point as pairs of viewing direction and color value. In addition to the color values, a 3D location is defined for each sample point.

Figure 9:
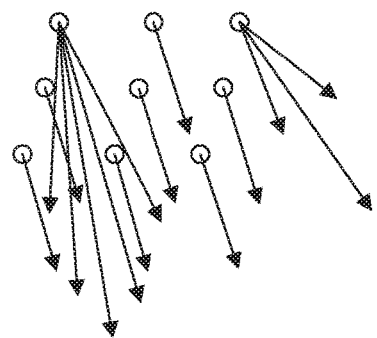
FIG. 9 illustrates collection of ray tracing results for each sample point.

FIG. 9 illustrates collection of ray tracing results for each sample point. In the example, point locations are associated with resulting sample point values from various viewpoint directions. For example, the sample point associated with the elliptical area 604 shown in FIG. 6 is associated a number of viewing locations. A pair of viewing direction and color values are collected for each of the number of viewing locations. For the sample point associated with the star-shaped area 606 shown in FIG. 6, a relatively larger number of viewing direction and color values are collected. Notably, the larger number of pairs for this particular sample point reflects the denser angular sampling of the sample point where the viewpoint angle was determined to have a high impact on the sample point appearance. Other sample points depicted in FIG. 9 are associated with a single pair of collected viewing direction and color pair values, where a single sample direction is determined to be sufficient for such points on a diffuse reflective surface where viewpoint variation does not have a significant impact on the sample point appearance.

The collection of sample point values is then sent to the client, and the server goes back to performing the next rendering step using updated viewpoint and sample density signaled by the client.

In some embodiments, the sampling with variable viewing directions is performed as a multi-pass rendering, where first sampling is done just from the main viewpoint signaled by the client. In addition to the color values for the samples to a color buffer (the size of which is determined by the client signaled sampling density), the distance from the viewpoint is stored as the fourth value for each sample. A float4 buffer may be used for this purpose, with the sample point RGB values stored as the first three elements and depth (e.g. the distance from the sample point distance to the viewpoint) stored as the fourth element normally used for alpha values.

Figure 10:
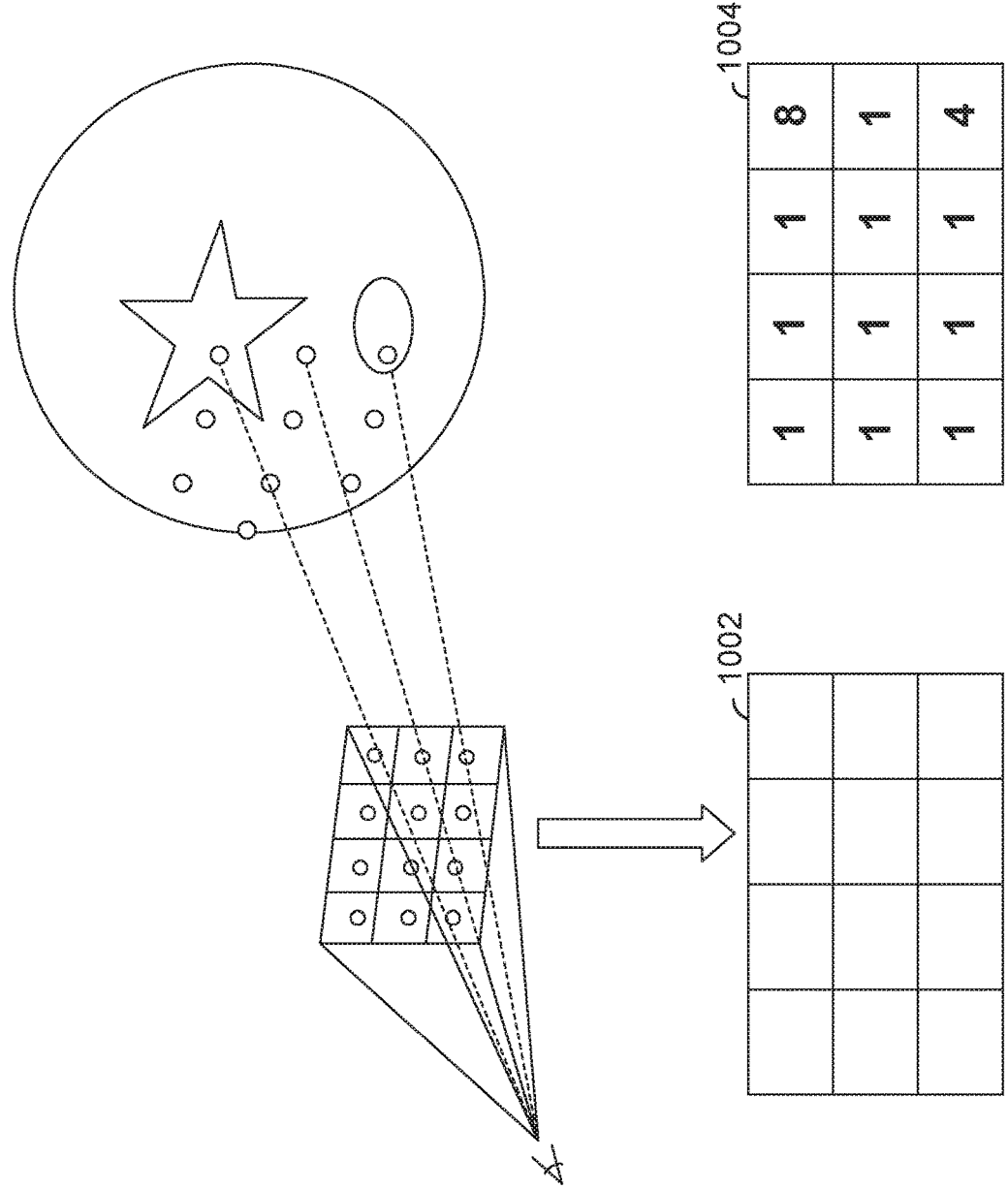
FIG. 10 illustrates first render pass buffers in some embodiments.

FIG. 10 illustrates first render pass buffers in some embodiments. In the example, the color and depth values are stored in main viewpoint render buffer 1002. In the first render pass, in addition to defining color and depth values for sample points, the amount of desirable additional viewing directions may be determined e.g. based on material properties and sample point distance from the viewpoint. The determined number of viewing directions may be stored to a separate viewpoint sample count buffer 1004 (e.g. a matrix defining how many additional variable viewpoints are to be sampled for each initial sample). The stored values in the viewpoint sample count buffer 1004 may be uchar or bit values. The buffer size may be configured to be equal to the size of the main viewpoint render buffer 1002, which is determined by the client-defined sample density. In this first render pass, the server may, based on the material of the sample point, increase the number rays spawned for further tracing if the material is glossy to avoid sampling noise, or the server may increase the number of variable viewpoints to be sampled in case of more reflective and/or transparent material.

Based on the viewpoint sample count matrix, the server determines the size for another buffer to which alternative viewpoint samplings are to be stored. The buffer size is determined by the sum of sample counts defined in the sample count matrix, increased to the next power of two resolution. A range of the alternative viewpoints and spread of alternative viewpoints is signaled by the client to the server. For this purpose, the client determines angular variations to be produced for sample points as a list of variable viewpoint locations. The server determines by the number of provided alternative viewpoints what is the maximum number of additional samplings and then interpolates the number of samplings per sample point to be used according to the surface reflectance and transparency.

Figure 11:
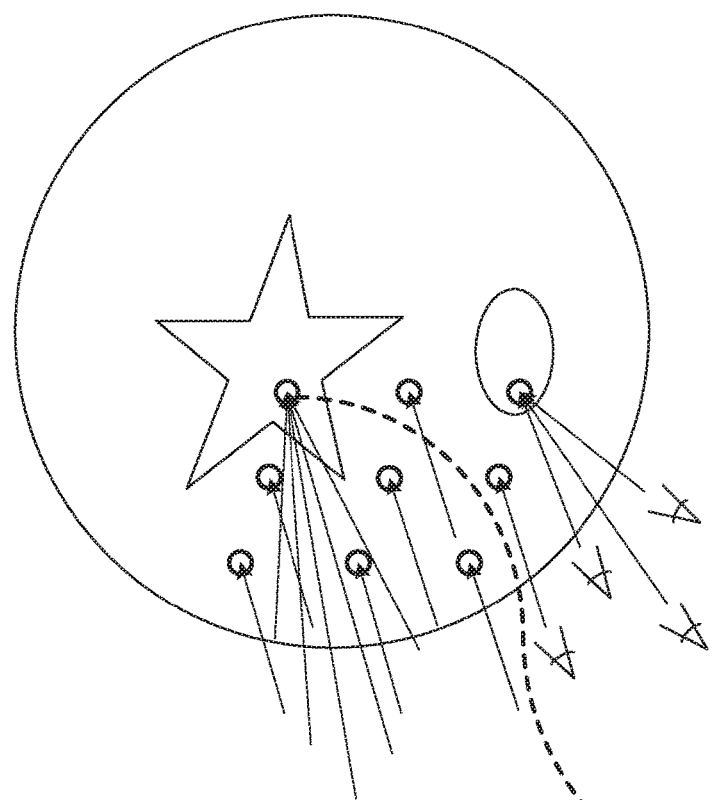
FIG. 11 illustrates second render pass buffers in some embodiments.
Figure 11:
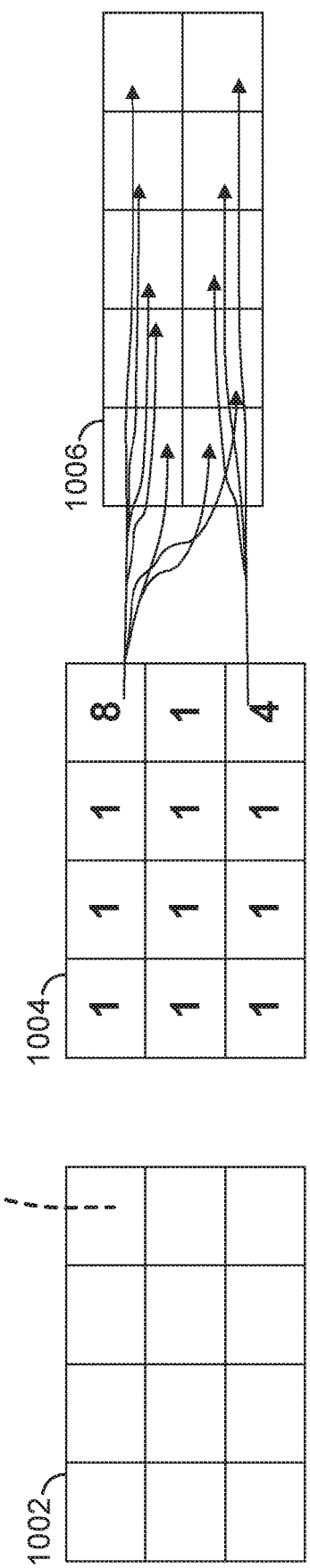

FIG. 11 illustrates second render pass buffers in some embodiments. In an example embodiment of a second render pass, sample point values are determined for the number of varying viewing directions determined in the viewpoint sample count buffer 1004. Sample point location is resolved from the distance of the sample point stored in the main viewpoint render buffer 1002 together with the location of the main viewpoint. For each varying viewpoint direction, the incoming ray angle to the sample points is determined by the alternative viewpoint list. Rays are generated from the alternative viewpoint to the sample point and from there, recursively spawned forward. For these rays, a viewpoint identifier determining the alternative viewpoint used when spawning the original ray is stored with the payload of the iterative ray tracing so that returning values are accumulated to the corresponding location in alternative viewpoint sampling buffer 1006. The buffer size of the alternative viewpoint sampling buffer is determined by the total number of alternative viewing directions to be sampled (e.g. stored in the viewpoint sample count buffer 1004 from the first render pass).

Once the server has completed the second render pass, it may send the main viewpoint render buffer, viewpoint sample count buffer, and alternative viewpoint sampling buffer to the client.

Viewing Client

Figure 12:
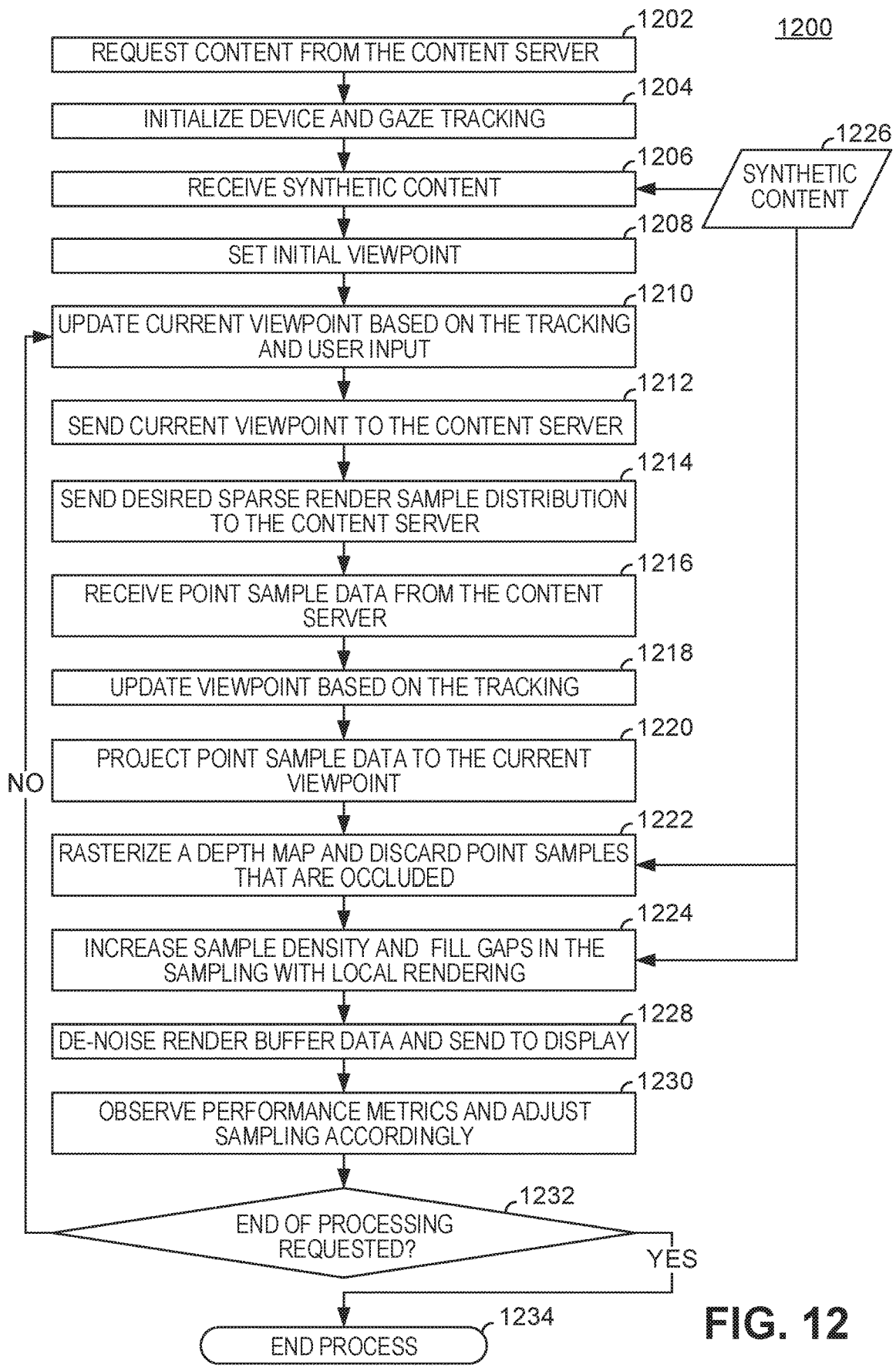
FIG. 12 is a flow diagram illustrating an example method performed by a client in some embodiments.

FIG. 12 illustrates an example method 1200 performed by a viewing client, in accordance with some embodiments. At 1202, the method includes requesting the desired content from the content server. At 1204, the device and gaze tracking are initialized. At 1206, the client receives synthetic content 1226. Initially, the content server may send the full synthetic scene to the viewing client, or alternatively the viewing client may send the full synthetic scene to the content server. The client and server may also both have the content already stored locally, or it may be retrieved by both entities from a third content source. The processing proceeds when both client and server have the same synthetic scene available.

The method may employ user input and/or eye tracking to determine the viewpoint and sample distribution. Once the client has the synthetic content, at 1208 an initial viewpoint to the scene is determined. At 1210, a current viewpoint may be updated based on the tracking and/or user input. At 1212, the client sends the current viewpoint to the content server. At 1214, the client may additionally send a desired sample distribution. A sample distribution request may include a field of view to be sampled from the viewpoint, a spatial resolution, a distribution of the spatial resolution, an angular variation of the viewpoint, and an angular resolution the client wants the server to use in rendering a sparse point cloud. In some embodiments, the client may determine the desired sampling distribution based on e.g. tracked or estimated viewer and/or gaze motion, and/or based on display capabilities. Furthermore, client graphics processing performance may be a factor in determining the desired level of sampling. For example, the client may have an estimate of the extent of how dense of sampling it can produce within processing budget of single rendering step locally. Accordingly, the client may request additional rendering from the server to reach a certain level of sample density.

At 1216, the viewing client receives point cloud data rendered by the content server. At 1218, the client may update the viewpoint based on tracking. At 1220, the client projects point sample data to the current viewpoint. For example, when rendering the received content, the viewing client renders the point cloud data by using viewing directions matching the current viewpoint or by interpolating color values from nearby viewing directions included with each sample point. The viewing client analyses the sampling resulting from projecting the point cloud data to the current viewpoint and based on that may perform local rendering (1224) to fulfill gaps in the sample space or to increase the sample density for a desired area. For example, sampling density may be increased by the local rendering according to the eye tracking to increase the resolution at the fovea area. Local rendering may also be used to fill gaps in the sampling that may for example be caused by the disocclusions taking place due to the varying between viewpoint being used for rendering and the local up-to-date viewpoint.

In addition to creating gaps, the viewpoint variation on the client side from the main viewpoint used by the server can cause occlusions. To avoid samples from the point sample data received from the server that have become occluded due to motion parallax by nearer geometry, the client may also rasterize (1222) a depth map using the local full synthetic scene, and then use the depth map to discard point samples that have greater depth than the depth value of the locally produced depth map.

Once the viewing client has projected samples produced by the content server to the current up-to-date viewpoint and augmented those samples with local rendering, the resulting image may be denoised (1228) to achieve final image that is being send to the display.

During rendering the client may observe (1230) performance metrics such as the processing time it takes to render perform tasks of local rendering, data compositing, denoising, etc. The client may accordingly adjust the manner of sampling. For example, if rendering exceeds a threshold time set as a budget available for a single frame, the client may reduce sample rate used for local rendering and request higher sampling density from the server. Furthermore, if rendering can be performed well under threshold time, the client may increase the local sampling density and decrease sampling requested from the server. This balances the workload between server and client. At 1232, the client may end the process in response to an end process request; otherwise, the method is repeated, e.g. starting from element 1210 described above.

Additional Embodiments

In some embodiments, the client requests that the content server render specific viewpoints with specific sample distributions. Other embodiments operate in a client pull model where instead of client controlling the rendering at the server side, the server produces several streams with varying point samples and the viewing client can select which of the point sample feeds it receives. In this approach, the content server may render content from several different viewpoints around the scene using some predefined angular variation and angular resolution. The client may then select rendering feed most closely matching the current viewpoint and then combine that data with a local rendering. Also, instead of sending several viewpoints with some viewpoint variation support, the content server may send data representing view from single viewpoint as a single feed and then send additional feeds that have data that extends the viewing angles as individual streams.

Delivering Light Fields for Real-World Objects in a Viewing Environment

It would be desirable for light field display-based solutions to have the ability to present AR experiences for multiple users in different viewing directions.

Light field displays can serve multiple viewers in different viewing directions and may be capable of displaying light field visualizations at different depth positions for viewers in different viewing directions. Example embodiments describe herein provide light field visualizations for physical real-world objects that are in the viewing environment of a light field display.

A light field display that offers a multitude of views and a wide FOV for light field content may provide light field visualizations for all viewing directions of the display within the FOV. A light field display may be used to provide suitable line-of-sight to an area around a real-world object as seen by a viewer and to represent instructions for an object of interest in the viewer's line of sight to a light field display device above the physical object in a correct depth position.

Figure 13:
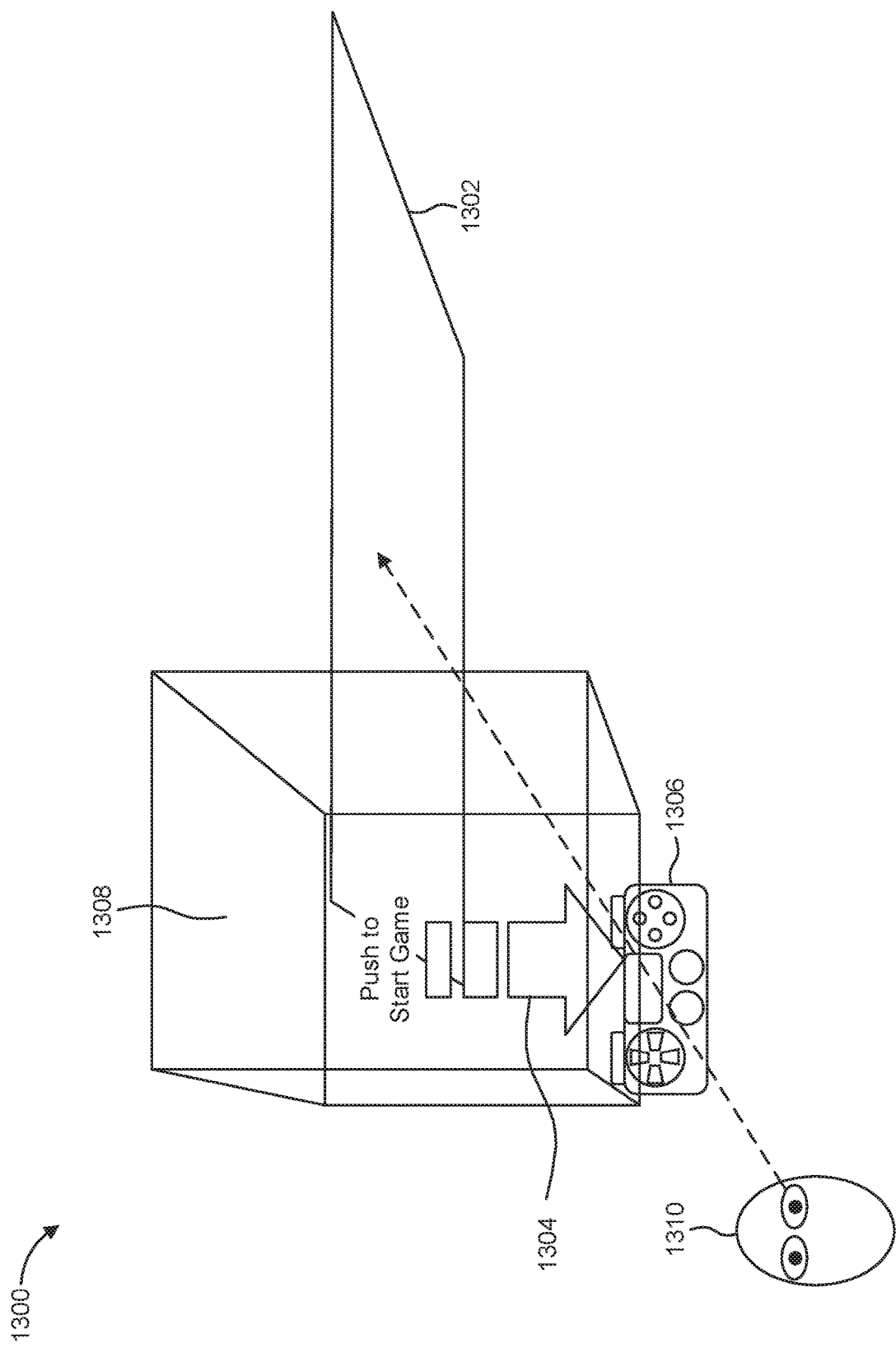
FIG. 13 is a schematic illustration of a light field display presenting a light field visualization for a real-world object of interest at an appropriate depth position inside the viewing volume on the viewer's line-of-sight to the light field display.

FIG. 13 is a schematic illustration of a light field display 1302 presenting light field visualization 1304 for a real-world object of interest (game controller 1306) at an appropriate depth position inside the viewing volume 1308 on the line-of-sight to the light field display for viewer 1310. However, the line of sight rule limits placement of light field content and calls for the image to lie on the line between the viewer's eye and display surface.

Existing AR/MR solutions support enriching the physical environment with visual content. However, the existing solutions may not adequately support adaptive preparation of light fields to enrich the use/viewing of physical objects in a viewing environment of a light field display. For example, there may be a great number of physical objects in the viewing environment. In addition, the properties of a light field display (e.g., FOV, depth region, and pose of the display in the viewing environment) can set limitations for light field visualizations that can be provided for viewers and for physical objects of interest.

A light field display may be used for displaying light field visualizations in a viewing environment so that the viewers can see light field visualizations related to physical objects of interest without a need for glasses. For example, there may be a light field display system that is capable of tracking viewers and detecting physical objects in the viewing environment and displaying light field visualizations for physical objects of interest in correct positions, orientations, and depth distances for the viewers of the light field display.

Issues Addressed in Some Embodiments

The fluent use of light field visualizations related to physical objects of interest calls for a solution supporting efficient preparation of light field visualizations for the physical objects of interest.

Some embodiments operate to determine viewing volumes for current and predicted viewing positions of a light field display. For example, the viewers viewing position relative to a light field display and the depth region and FOV of a light field display may affect the bounds of a viewing volume.

Some embodiments operate to determine viewing volume relation to the pose of the physical object in different viewing positions. Some embodiments operate to classify viewing volume in relation to the pose of the object of interest and provide the following kinds of classifications for the relation: "Object inside viewing volume", "Object outside viewing volume", "Object on the left side of the viewing volume", "Object in the front of viewing volume", and "Object behind the viewing volume". The determined viewing volume relation to the pose of the object of interest may be then later used in preparation of full or limited light field visualizations for the physical objects and displaying the prepared light field visualizations in a viewing environment.

Some embodiments operate to prioritize preparation of light field visualizations for physical objects in a viewing environment. Some embodiments operate to determine optimized preparation order for light field visualizations to be provided for the physical objects of interest nearby a light field display. For example, there may be prepared primary light field visualizations for high and medium priority objects of interest and secondary light field visualizations for low priority objects of interest. The prioritization may depend on the viewing volume relation to the pose of the object of interest. For example, light field visualizations may be prepared first for high priority physical objects that are inside the viewing volume in the viewer's line of sight to a light field display device. In the second phase reduced light field visualizations may be prepared for medium priority physical objects that are outside a viewing volume (e.g., for objects on the left side of the viewing volume or in the front of the viewing volume). In the third phase secondary light field visualizations may be prepared for low priority physical objects that are outside the viewing volume but may potentially move inside the viewing volume. For example i) a viewer can move, and/or ii) an object of interest can move, and/or iii) a light field display can move or rotate so that it is possible to provide a full or reduced light field visualization for the object of interest.

Example methods described herein support adaptive preparation of light field visualizations for physical objects of interest in a viewing environment of a light field display. In some embodiments, primary light field visualizations are prepared first for physical objects that are currently on the line between each viewer's eye and display surface. Secondary light field visualizations may be prepared later for less important physical objects that do not call for urgent preparation and visualization of light field content. Example embodiments are described in greater detail below.

Light Field Visualization

A light field client may use a light field visualization as an input and convert a display-specific light field visualization to be displayed for the viewers. A light field visualization may depend on the type of the light field display.

For a super-multiview light field display that does not provide variable focus control, a light field visualization may be an angular view array that enables a light field client to convert a display-specific light field visualizations for desired viewing directions.

In case of a multi-focal display, the light field visualization may be an angular view stack array that contains view stacks for different viewing directions. In the view stacks there may be views that are prepared for the supported focal planes of the display. A light field client may use an angular view stack array and convert a display-specific light field visualizations for the desired viewing directions and for the supported focal planes.

Display Description

In some embodiments, a display description may be used to provide information on a display, as follows. The display description may include some or all of the following information. The display's spatial and angular resolution in different viewing directions may be indicated. There may be non-uniformity in a light field display's spatial and angular resolution in different viewing directions. Thus, the display's spatial and angular resolution in different viewing directions field can describe spatial and angular resolution for each possible viewing direction of the display. This may be due to different allocations of view interpolation or processing elements and hence vary in time.

The display's horizontal field of view may be indicated by the maximum horizontal field of view in degrees that is possible to show in the light field display.

The display's vertical field of view may be indicated by the maximum vertical field of view in degrees that is possible to show in the light field display.

A display type may indicate a type for the light field display. The type field may have value such as "super-multiview light field display" or "multi-focal light field display".

The display's depth range may be indicated by a value describing the light field display's capability to display visual content (e.g., focal planes) in different depth distances.

The display description may also include a focal plane count. Focal distances may be quantized into a small number of fixed focal planes. The focal plane count field may indicate the number of focal planes that are possible to present in the light field display.

The display description may further include focal plane descriptions. The focal plane descriptions may describe the focal planes that are possible to present in a light field display. For each supported focal plane there may be i) an associated focal plane depth distance, which may define depth distance for a focal plane, and ii) an associated focal plane resolution, which may indicate a resolution for a focal plane.

Object Pose Description

In some embodiments, an object pose description may be used to describe a tracked or predicted pose of a physical real-world object in a viewing environment. An object pose description may contain some or all of the following information.

An object identifier field may indicate a unique identifier for a detected physical object.

An object type field may determine a type for a detected physical object. For example, the type of the object may be "game controller."

An object pose field may determine x, y, and z position and orientation for a detected physical object in the viewing environment relative to the pose of the light field display.

A timestamp for the object pose field may determine a timestamp for the tracked or predicted object pose.

Light Field Object Description

In some embodiments, a light field object description may determine a physical real-world object of interest in a viewing environment. A light field object description may contain some or all of the following information.

An object pose description field may indicate an object pose description for the object of interest.

A viewing volume relation to object of interest field may indicate a relation such as "Object inside viewing volume", "Object outside viewing volume", "Object on the left side of the viewing volume", "Object in the front of viewing volume", or "Object behind the viewing volume" that determines viewing volume relation to the object of interest.

An object priority field may indicate a determined priority for the light field object. The field may have value indicating a priority such as "high priority object", "medium priority object", or "low priority object".

An associated light field addition mode field may indicate a mode such as "Same light field content for all viewers" or "Viewer specific light field content" to direct selection of light field content for the detected physical real-world object and for viewers in different viewing directions.

Viewing Volume Description.

In some embodiments, a viewing volume description describes a viewing volume that is possible to display for a specific viewing position of a light field display. A viewing volume description may contain some or all of the following information.

A bounds for viewing volume field may describe 3D bounds for a viewing volume that can be used for displaying light field visualizations for a viewer of a light field display. The bounds for a viewing volume can be determined relative to the pose of the light field display.

Viewing Position Description

In some embodiments, a viewing position description determines a specific viewing position for a light field display. A viewing position description may contain some or all of the following information.

A field may be used to indicate the positions of viewers eyeballs relative to a light field display.

A viewing volume description field may describe the viewing volume that is available for the viewer in the viewing position.

A light field object descriptions field may describe light field object descriptions for the physical objects of interest that relate to the viewing position.

A viewer identifier field may define a unique identifier for a viewer related to the viewing position.

Environment Data

In some embodiments, environment data provides information about viewers and objects in a tracked or in a predicted viewing environment. Environment data may contain some or all of the following information:

A type of data field may determine type of the environment data to be "tracked environment data" or "predicted environment data."

A viewing position descriptions field may define viewing position descriptions for the tracked or predicted viewing positions.

An object pose descriptions field may define object pose descriptions for the tracked or predicted poses of the objects of interest.

Light Field Visualization Description

A light field visualization description describes a light field visualization that is prepared to cover determined viewing positions in the viewing environment. A light field visualization description may contain some or all of the following information:

A covered viewing positions field may indicate a set of viewing position descriptions for viewing position for which there are provided light field visualizations. For example, there may be provided a viewing position description for a tracked position of a viewer. In addition, there may be provided viewing position descriptions for specific viewing positions to cover a range (e.g., 10 degrees range) of viewing directions in horizontal and vertical directions for which there are provided light field visualizations. As a result, a light field visualization may be visible for the current viewing position and for a certain viewing region in horizontal and vertical directions.

A playback time field may describe a playback time for the light field visualization. As a result, it is possible to determine a light field visualization description for a light field visualization that may be displayed directly and for a light field visualization that may be displayed at a determined time in the future.

An "is visualization in cache" field may have value indicating "yes" or "no". The value "yes" may indicate that a light field visualization is prepared for the determined viewing positions and stored to the content cache.

An "are the light field assets in cache" field may have value indicating "yes" or "no". The value "yes" may indicate that light field assets (e.g., 3D models) that are to be used in preparation of light field visualizations are available in the content cache.

Light Field Preparation Model

In some embodiments, a light field preparation model is used to describe a model to enhance preparation of primary and secondary light field visualizations for physical real-world objects in a viewing room. A light field preparation model may contain some or all of the following information:

Light field visualization descriptions for primary light field visualizations may determine light field visualization descriptions for light field visualizations that are used in the current viewing positions of the light field display.

Light field visualization descriptions for secondary light field visualizations may determine light field visualization descriptions for light field visualizations that are used in a predicted viewing environment of a light field display.

Solution Environment

Figure 14:
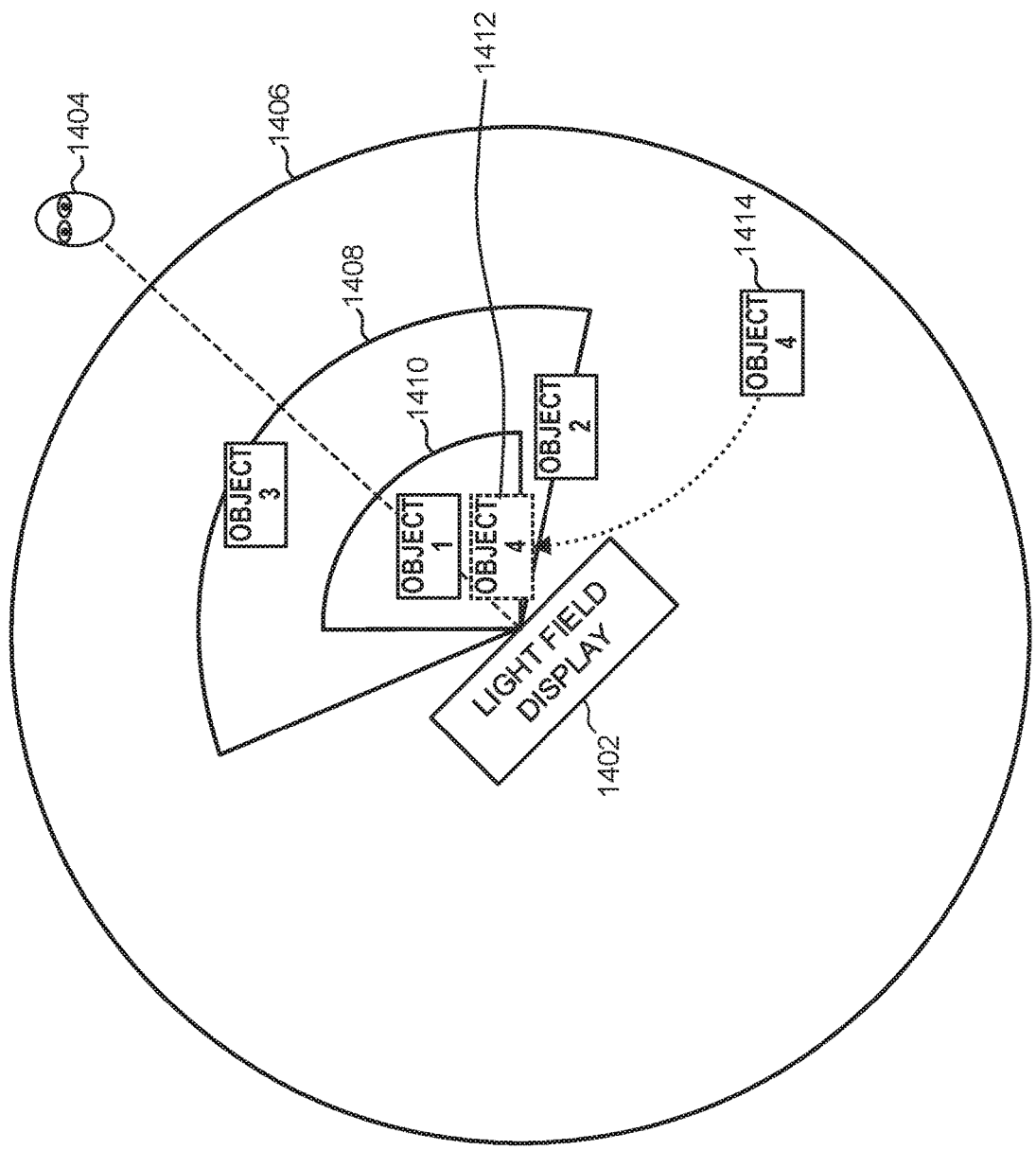
FIG. 14 is a schematic illustration of primary and secondary light field visualizations for physical objects in a viewing environment.

FIG. 14 is a schematic illustration of primary and secondary light field visualizations for physical objects in a viewing environment. In the example, viewer 1404 has a line of sight to light field display 1402. Volume 1406 represents a volume for low priority physical objects, where visualizations of objects in this volume may be determined as not needed. Volume 1408 represents a volume for medium priority physical objects, where limited light field visualizations may be prepared for objects. Volume 1410 represents a volume for high priority physical objects, where full light field visualizations may be prepared for objects. Object 4 represents a moving object 1414. If moving object 1414 has a predicted pose within the FOV of the light field display (and thus has a higher predicted interest for the viewer), a limited or full light field visualization may be prepared.

Figure 15:
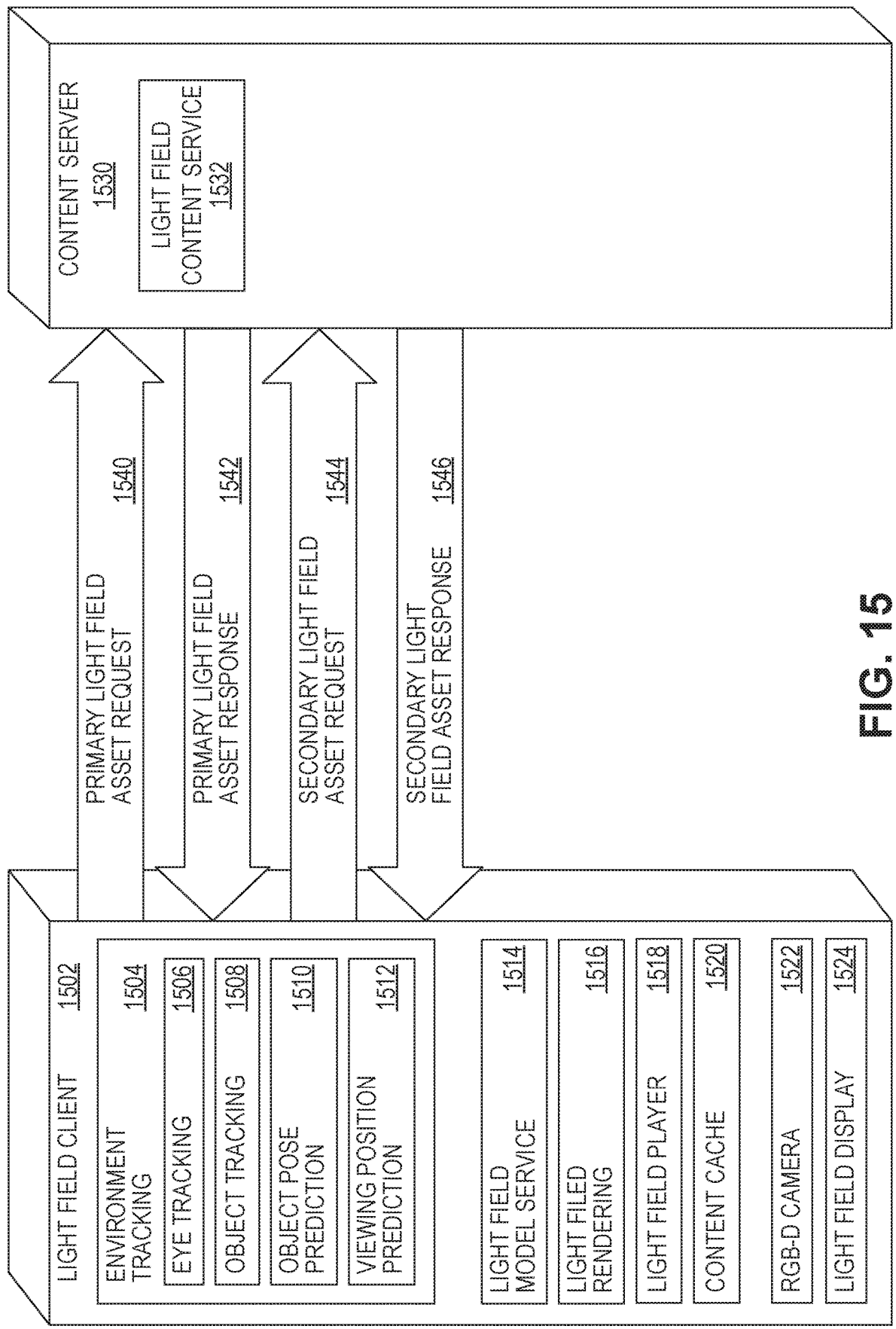
FIG. 15 is a schematic illustration of functional components used in some embodiments.

FIG. 15 is a schematic illustration of functional components used in some embodiments. As illustrated in the figure, example components include content server 1530 and light field client 1502. The content server may include a light field content service 1532. The light field content service is capable of delivering light field assets for light field clients. The light field assets may for example be 3D models that enable rendering of full or limited light field visualizations for objects of interest.

Example embodiments may use a light field client, e.g. light field client 1502. In some embodiments, the light field client has a fast Internet connection that is used for delivering light field content from the content server for the light field client. The light field client may include sensors such as an RGB-D camera 1522 that is capable of providing an RGB-D video feed of the viewing room. The light field client may include a light field display module 1524 that is capable of presenting light field visualizations for the viewers of the display.

Additional modules of the light field client may include an environment tracking module 1504. The environment tracking module may provide one or more services that are capable of producing tracking data of the viewing environment. Services may include some or all of the following.

Eye tracking module 1506 is capable of using the video feeds of RGB-D cameras in a viewing room for tracking positions of the eyeballs of the viewers of a light field display. Eye tracking may be based on solutions supporting gaze estimation from remote RGB, and RGB-D cameras, such as solutions described in Funes Mora et al., "Eyediap: A database for the development and evaluation of gaze estimation algorithms from rgb and rgb-d cameras," In: Proceedings of the Symposium on Eye Tracking Research and Applications, ACM, 2014. p. 255-258.

Object tracking 1508 is a service that is capable of using the RGB-D feeds that are captured of the viewing room and detecting and tracking physical objects in the room. The detection of physical objects may be based on the existing indoor scene analysis methods that are capable of interpreting the major surfaces, objects, and support relations of an indoor scene from an RGB-D image. An example of a technique used in some embodiments is described in Silberman et al., "Indoor segmentation and support inference from rgbd images. In: European Conference on Computer Vision. Springer, Berlin, Heidelberg, 2012, p. 746-760. The tracking of physical objects may be based on existing visual object tracking methods and on the available RGB-D camera sensors. Techniques used in some embodiments include those described in Yilmaz et al., "Object tracking: A survey," ACM Computing Surveys (CSUR), 2006, 38.4: 13.

Object pose prediction 1510 is a service that is capable of producing predicted pose values (e.g., 3D positions and orientations) for physical objects of interest at a specific time in the future. Production of predicted pose values for physical objects of interest may be based on RGB-D image data, on produced object tracking data, and on existing object motion prediction solutions such as Kalman filtering-based object motion prediction models and visual object motion prediction solutions. Motion prediction techniques used in some embodiments include those described in Zhang et al., "An extended self-adaptive Kalman filtering object motion prediction model," in: Intelligent Information Hiding and Multimedia Signal Processing, 2008, IIHMSP'08 International Conference on, IEEE, 2008, p. 421-424, and in Gennadiy et al. Method of tracking object and electronic device supporting the same. U.S. Patent Application US20140233800A1.

Viewing position prediction 1512 is a service that is capable of producing predictions for viewers' viewing positions and determining viewing position descriptions for the predicted viewing positions. Prediction of viewing positions may be based on RGB-D image data, on existing visual head tracking solutions and on existing predictive user pose and head tracking solutions. Solutions that may be employed in some embodiments include those described in Deisinger & Kunz, "Double Exponential Smoothing: An Alternative to Kalman Filter-Based Predictive Tracking"; Kiruluta et al., "Predictive head movement tracking using a Kalman filter," IEEE Transactions on Systems, Man, and Cybernetics, Part B (Cybernetics), 1997, 27.2: 326-331; and La Cascia et al., "Fast, reliable head tracking under varying illumination: An approach based on registration of texture-mapped 3D models," IEEE Transactions on pattern analysis and machine intelligence, 2000, 22.4: 322-336.

Additional modules of the light field client may include some or all of the following. Light field model service 1514 is capable of using tracked or predicted environment data and determining a light field preparation model for a light field to be used in a viewing environment of a light field display. Light field rendering 1516 is a software module that is capable of producing display-specific light field visualizations for the objects of interest. Light field player 1518 is a software module that is capable of fetching light field content from the server-side and presenting light field visualizations in a light field display. Content cache 1520 is a software module that is capable of storing light field assets and light field visualizations. For example, the light field assets such as 3D assets may be fetched and cached to enable rendering of light field visualizations for physical objects of interest. In addition, light field visualizations that are prepared for the physical objects of interest may be stored to the content cache.

Overview of Example Methods

In some embodiments, an example method supporting adaptive preparation of light field visualizations for physical objects of interest in a viewing environment of a light field display includes 1) environment tracking, 2) preparation and output of light field visualizations for viewing environment, and 3) preparation of light field visualizations for a predicted viewing environment. These processes are described in further detail below.

Environment tracking may include the tracking of physical objects, the tracking of viewers, the determination of light field visualization descriptions, and the determination of light field preparation model for tracked viewing environment.

Preparation and output of light field visualizations for the viewing environment may include the delivery of light field assets for primary light field visualizations, the preparation of primary light field visualizations for super-multiview light field display or multi-focal light field display, and the displaying of the light field.

Preparation of light field visualizations for predicted viewing environment may include the prediction of viewing positions, the prediction of poses of physical objects of interest, the determination of light field preparation model for predicted viewing environment, the delivery of secondary light field assets, the preparation of secondary light field visualizations, and update for the light field.

Methods such as the foregoing are described in greater detail below. Example methods are capable of preparing light field visualizations for physical objects of interest via light field displays without a need for a headset for locations that lie on the line between the viewer's eye and display surface, satisfying the line-of-sight rule.

Environment Tracking

Figure 16:
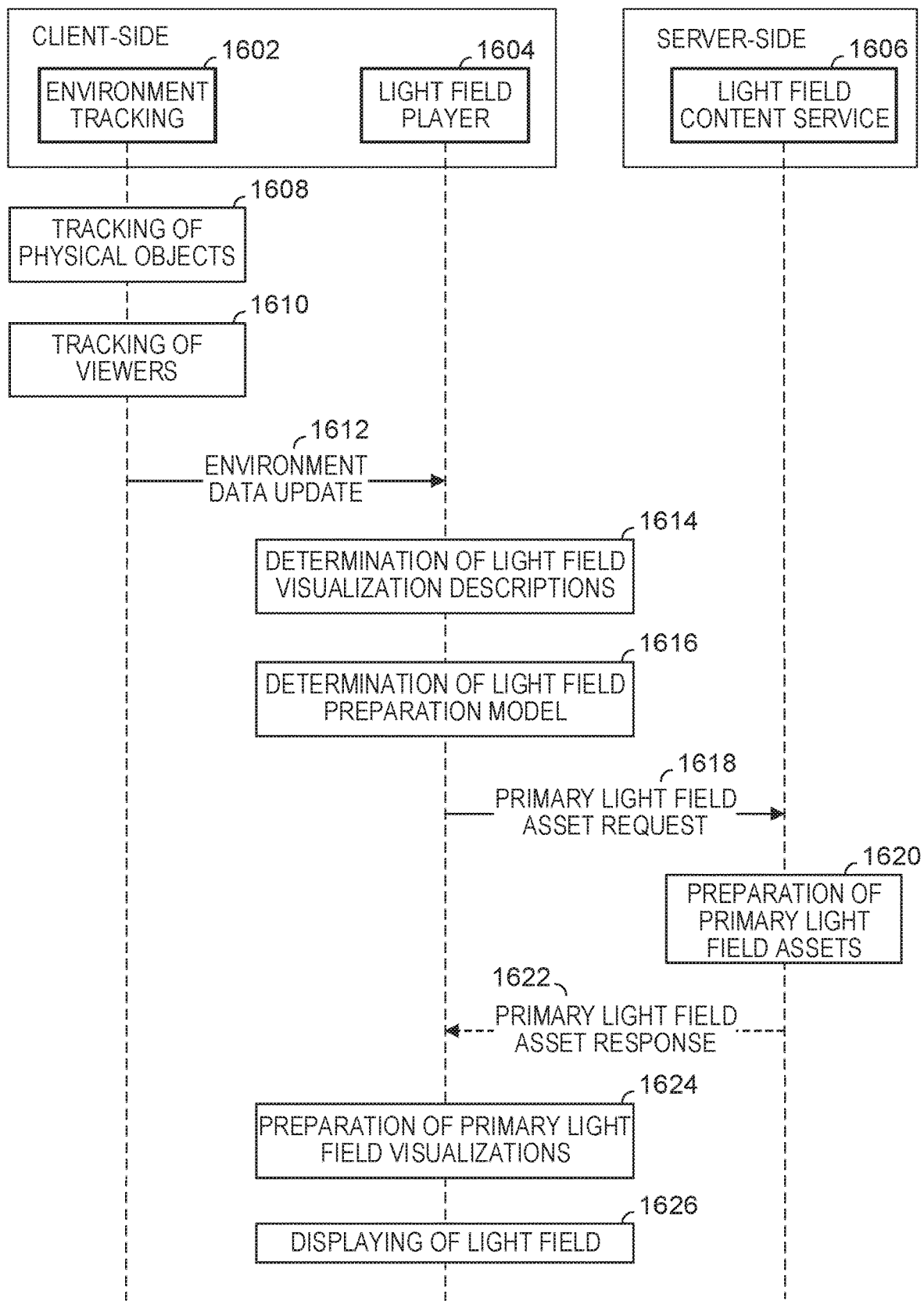
FIG. 16 is a first sequence diagram of an example process performed in some embodiments.
Figure 17:
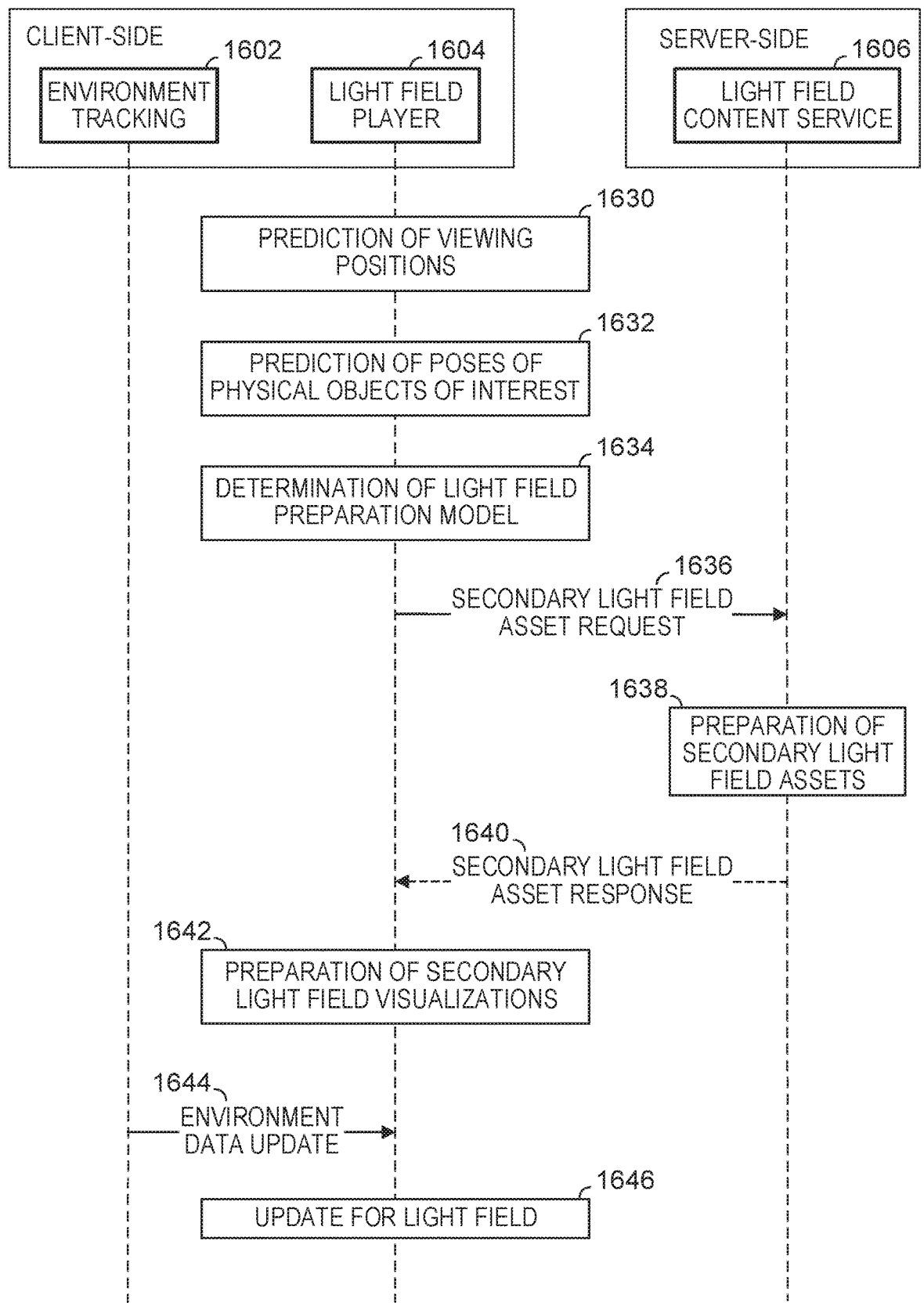
FIG. 17 is a second sequence diagram of the example process performed in some embodiments.

FIGS. 16-17 depict an example method to support adaptive preparation of light field visualizations for physical objects of interest in a viewing environment of a light field display. The method is described in more detail in following subsections.

In the method shown in FIGS. 16-17, environment tracking is used to produce environment data and determine light field preparation model for the viewing environment by performing the processes described in the following subsections.

Tracking of Physical Objects.

Referring now to FIG. 16, the environment tracking service 1602 may use the object tracking service for tracking of physical objects of interest 1608. The object tracking service may use RGB-D data, detect physical objects in the viewing environment, determine positions and dimensions (width, height, depth) for the physical objects, and produce object pose descriptions for the detected physical objects.

Tracking of Viewers.

Environmental tracking service 1602 may perform tracking of viewers 1610. A viewing environment may be a room (e.g., a living room at home) where the viewers can move freely. The environment tracking service may use the eye tracking service that can detect the positions of the eyeballs of viewers relative to the light field display and the viewing directions of viewers at different points of time and produce viewing position descriptions for the tracked viewers.

The environment tracking service may also identify viewers in a case in which it is desirable to provide viewer-specific light field content for detected physical objects.

Determination of Light Field Visualization Descriptions.

An environment tracking service 1602 delivers an environment data update message 1612 containing environment data for the light field player 1604 that requests the light field model service to determine light field visualization descriptions for the viewing environment.

At 1614, the light field model service may use the environment data and determine a light field visualization description for each detected viewing positions.

A light field visualization may be prepared to cover the current viewing positions of the viewers and also to cover a certain viewing region in horizontal and vertical directions. The light field model service may determine viewing position descriptions to a light field visualization description. For example, the light field model service may use the display description and the viewers viewing position description and determine a set of viewing position descriptions for viewing positions to cover a range (e.g., 10 degrees range) of viewing directions in horizontal and vertical directions for which there should be prepared light field visualizations. The covered viewing range may be selected based on the client's available processing capabilities and on the desired response times. For example, the light field model service may limit the covered viewing range for decreasing the latencies that are related to the preparation of light field visualizations.

The light field model service may then determine a viewing volume description to each produced viewing position description.

The light field model service may then use the object pose descriptions of environment data and produce a light field object description for each object pose description and finally insert the determined light field object descriptions to viewing position descriptions.

In determination of light field object descriptions, the light field model service may first insert an object pose description to a light field object description.

The light field model service may use the object pose description and the viewing volume description of the viewing position description and determine the viewing volume relation to the physical object. For example, the viewing volume relation to a viewers viewing volume may be determined to be "Object inside a viewing volume", "Object outside a viewing volume", "Object on the left side of a viewing volume", "Object in the front of a viewing volume", or "Object behind a viewing volume".

The light field model service may then determine object priority to each light field object description. The object priority value may depend on the viewing volume relation to a viewers viewing volume. For example, an object priority value may be "high priority object" for the objects that are inside viewing volume, "medium priority object" for the objects that are nearby viewing volume (e.g., for physical objects on the left side of the viewing volume), and "low priority object" for the objects that are outside viewing volume and have a long distance to the viewing volume.

The object priority value may be "light field visualization not needed" for an object that is not interesting for the viewer. For example, viewer preferences may indicate that light field content is provided for all object types or then viewer preferences may determine a list of object types that are interesting for the viewer and use light field visualizations to enrich use/viewing of physical objects in the viewing room.

The light field model service can, for example, use viewers' privacy preferences and determine associated light field addition mode in the light field object description to have the value "Same light field content for all viewers" or "Viewer specific light field content".

Determination of Light Field Preparation Model for Tracked Viewing Environment.

At 1616, the light field preparation model is determined. The light field player delivers the light field visualization descriptions for the light field model service that inserts the light field visualization descriptions to the light field preparation model. The light field model service delivers the light field preparation model for the light field player.

Preparation and Output of Light Field Visualizations for Viewing Environment.

Preparation of primary light field visualization may be performed as described in the following subsections.

Delivery of Light Field Assets for Primary Light Field Visualizations.

At 1618, the light field player may deliver a primary light field asset request containing the light field preparation model for the light field content service that may now use the model and, at 1620, prepare light field assets such as 3D assets to enable the client-side rendering of light field visualizations for physical objects of interest. In addition, based on the associated light field addition mode determined for a physical object, the light field assets may be delivered to enable preparation of light field visualizations that are provided for all viewers of a physical real-world object of interest or preparation of viewer-specific light field visualizations for an identified viewer and for a real-world object of interest.

At 1622, the light field content service may deliver the light field assets in a primary light field asset response for the light field player.

Preparation of Primary Light Field Visualizations.

At 1624, primary light field visualizations are prepared. The light field visualization descriptions determine the viewing positions to be covered in a light field visualization. The light field player may use the light field preparation model and request the light field rendering service to produce desired light field visualizations for the determined viewing positions if light field visualizations are not yet available in the content cache.

The prepared light field visualizations are stored to the content cache so that a light field visualization description is provided for each light field visualization. As a result, it is possible to later fetch a light field visualization for a specific viewer and for a viewer's viewing position.

After a light field visualization is prepared, the light field rendering service may update "Is visualization in cache" parameters in the light field visualization descriptions in the light field preparation model. As a result, the updated light field preparation model operates to determine the light field visualizations that already exist in the content cache and to provides light field visualization descriptions for light field visualizations to be prepared later.

Preparation of Light Field Visualizations for Super-Multiview Light Field Display.

In some embodiments, the light field rendering service may use the light field visualization descriptions in the light field preparation model and light field assets such as 3D models to prepare desired light field visualizations for a super-multiview light field display. In a case of a super-multiview light field display, a light field visualization may be an angular view array that provides views for different viewing directions.

In preparation of light field visualizations, the light field rendering service may use a light field preparation model and determine positions for visual content in a light field visualization so that content is displayed in correct positions and directions for physical objects of interest in a determined viewing position.

The type of a light field visualization may depend on the viewing volume relation to an object of interest. For example, a full light field visualization may be prepared for a physical object that is inside the viewing volume in the viewer's line of sight to a light field display device. A limited light field visualization may be prepared for an object outside the viewing volume in a case in which there is a short distance between viewing volume and object. For example, a limited light field visualization may be provided on the left side of the object when the object is on the right side of the viewing volume.

Preparation of light field visualizations for multi-focal light field display.

In a case of a multi-focal light field display, a light field visualization may be an angular view stack array that provides views for different viewing directions and also for different focal planes. The light field rendering service may use the light field visualization descriptions in the light field preparation model and light field assets such as 3D models and prepare desired light field visualizations for different viewers, for different viewing directions, and also for different focal planes of a multi-focal light field display. In preparation of light field visualizations the light field rendering service may use the light field preparation model and environment description to determine positions for visual content in a light field visualization so that content is displayed in correct directions and depth positions in the light field display.

Displaying of Light Field.

At 1626, the light field player converts display-specific light field visualizations from the prepared light field visualizations and displays the produced light field for the viewers.

Preparation of Light Field Visualizations for Predicted Viewing Environment.

Referring now to FIG. 17, the preparation of light field visualizations for predicted viewing environment step will first produce predictions for viewers' viewing positions and poses of physical objects of interest. Then light field visualization descriptions are prepared for the predicted viewing environment, and finally the light field visualizations are prepared to a content cache to be later displayed for the viewers of a light field display.

The preparation of light field visualizations for predicted viewing environment step include methods as described in following subsections.

Prediction of Viewing Positions

At 1630, the light field player requests that the viewing position prediction service produce viewing position descriptions for the predicted viewers' viewing positions.

The viewing position prediction service may use a predictive user pose and head tracking solutions to determine first a predicted head position for each viewer at a specific time in the future. In addition, there may be determined a range for viewing directions to be covered in a light field visualization. Thus, prediction of viewing position may produce a set of predicted viewing positions for each viewer to cover different viewing directions of a light field display.

In production of viewing position descriptions, a viewing volume description may be determined for each predicted viewing direction. A display description may determine horizontal field of view, vertical field of view, and depth range for a light field display. The viewing position prediction service may use a predicted head position and the horizontal field of view, vertical field of view, and depth range of the light field display and determine a viewing volume description for the predicted head position. The viewing position prediction service will finally deliver the produced viewing position descriptions for the light field player.

Prediction of Poses of Physical Objects of Interest.

At 1632, the light field player requests that the object pose prediction service produce predicted pose values for physical objects of interest. The object pose prediction service may produce object pose descriptions for the predicted pose values of physical real-world objects and finally deliver the produced object pose descriptions for the light field player.

Determination of Light Field Preparation Model for Predicted Viewing Environment.

At 1634, the light field player delivers a light field preparation model request containing predicted environment data for the light field model service. The determination of light field visualization descriptions for a predicted viewing environment may be now based on actions that are performed in the determination of light field visualization descriptions step and based on predicted environment data that provides predicted viewing position descriptions and object pose descriptions for the viewing environment.

The light field model service may use the predicted viewing position descriptions and predicted object pose descriptions to determine light field visualization descriptions for the secondary light field visualizations to the light field preparation model and may finally deliver the updated light field preparation model for the light field player.

Delivery of Secondary Light Field Assets

In the delivery of secondary light field assets, the light field player may use the predicted viewing position descriptions and predicted object pose descriptions of the physical objects of interest in the light field preparation model to determine those physical objects of interest that call for light field visualizations at a specific time in the future.

At 1636, the light field player may then deliver a secondary light field asset request containing the light field preparation model for the light field content service that may now use the model and, at 1638, prepare light field assets that are not yet available in the content cache and enable rendering of light field visualizations for a predicted viewing environment. At 1638, the light field content service delivers the light field assets in a secondary light field asset response for the light field player that may store the light field assets to the content cache.

Preparation of Secondary Light Field Visualizations

At 1642, the light field player may request that the light field rendering service prepare secondary light field visualizations for a predicted viewing environment. The preparation of secondary light field visualizations may be based on: similar actions that are performed in the preparation of primary light field visualizations for a multiview or a multifocal light field display step, on the light field visualization descriptions that are provided for the secondary light field visualizations in the light field preparation model, and on the light field assets that are available in the content cache.

The light field rendering service may store the prepared light field visualizations to the content cache so that a light field visualization description is provided for each light field visualization in the cache.

Update for Light Field

The update of a light field 1646 may be based on the environment tracking service that can perform continuous environment tracking and deliver environment data update messages containing updated environment data for the light field player.

The light field player may use the environment data (e.g. from environmental data update message 1644) and may activate an update of a light field. For example, a light field may be updated when the poses of physical objects of interest have changed. There may be prepared a light field preparation model for the changed viewing environment. After that, it is possible to prepare light field visualizations for the new light field visualization descriptions. In preparation, there may be first performed a lookup to a content cache to determine whether a suitable light field visualization already exists for the new light field description in the cache. For example, it is desirable for the cached light field visualization to be prepared for the viewer's viewing position and for the poses of physical objects of interest. Desired light field assets may be fetched to cache and new light field visualization may be prepared if suitable light field visualizations are not available in the content cache.

Once light field visualizations are available for the changed viewing environment, the light field player may convert display-specific light field visualizations from the prepared light field visualizations and display the updated light field for the viewers.

The locations of the modules used to enable the described processes may vary; for example, rendering of light field visualizations may be performed on the server-side or on the client-side or both.

Further Embodiments

Figure 18:
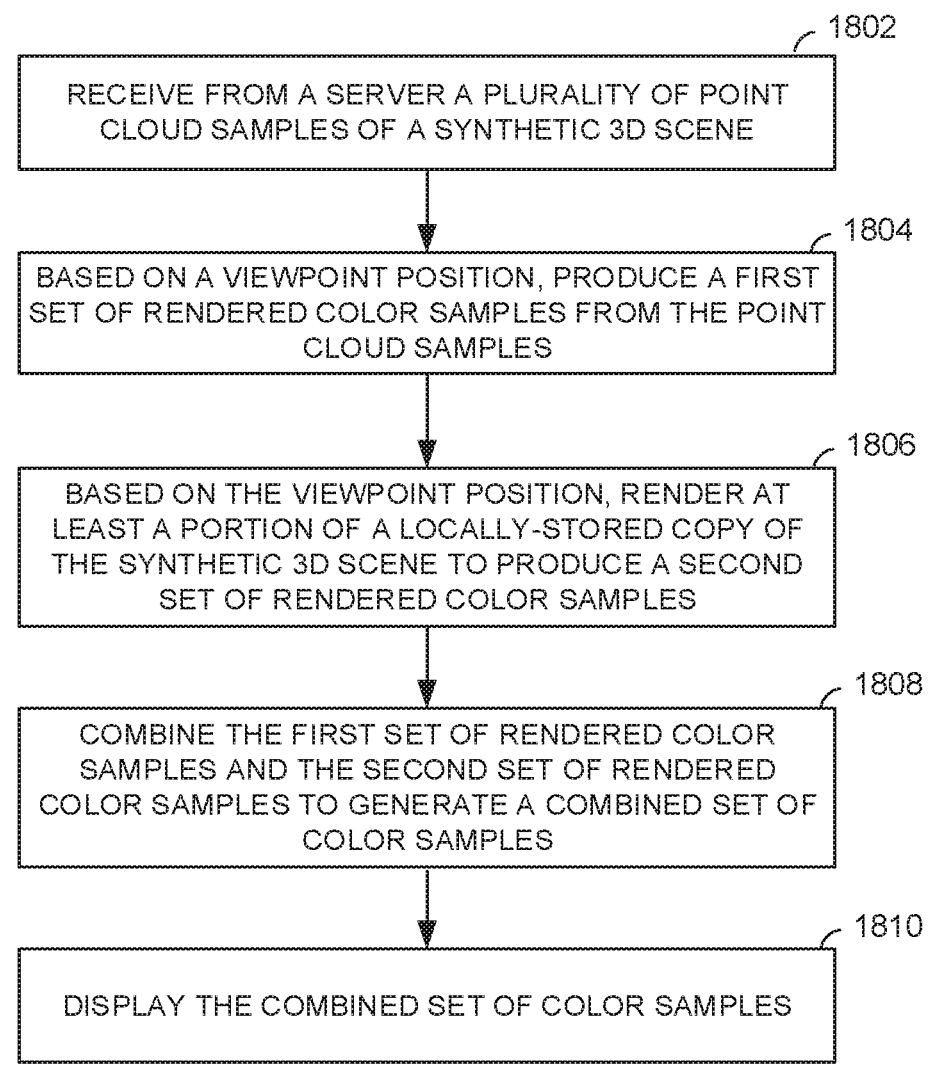
FIG. 18 is a flow diagram of an example method in accordance with some embodiments.

FIG. 18 is a flow diagram of an example method 1800 in accordance with some embodiments. The example method includes receiving (1802) from a server a plurality of point cloud samples of a synthetic 3D scene. The point cloud samples may include (i) a point location, (ii) at least one viewing direction, and (iii) color information for each of the viewing directions. The method 1800 further includes producing (1804) a first set of rendered color samples from the point cloud samples based on a viewpoint position. The method further includes rendering (1806) at least a portion of a locally stored copy of the synthetic 3D scene based on the viewpoint position to produce a second set of rendered color samples. The method further includes combining (1808) the first set of rendered color samples and the second set of rendered color samples to generate a combined set of color samples. The method further includes displaying (1810) the combined set of color samples.

A first example method in accordance with some embodiments includes: receiving from a server a plurality of point cloud samples of a synthetic 3D scene, each of the point cloud samples including (i) a point location, (ii) at least one viewing direction, and (iii) color information for each of the viewing directions; and rendering the synthetic 3D scene based on the point cloud samples and on a locally-stored copy of the synthetic 3D scene.

In some embodiments, the method further includes receiving the synthetic 3D scene from the server and storing the received 3D scene as the locally stored copy.

In some embodiments, the method further includes sending, to the server, information indicating a viewpoint position.

In some embodiments, the method further includes sending, to the server, information indicating a requested sample density.

In some embodiments, the synthetic scene comprises mesh information and surface texture information.

A second example method in accordance with some embodiments includes: receiving from a server a plurality of point cloud samples of a synthetic 3D scene, each of the point cloud samples including (i) a point location, (ii) at least one viewing direction, and (iii) color information for each of the viewing directions; based on a viewpoint position, producing a first set of rendered color samples from the point cloud samples; based on the viewpoint position, rendering at least a portion of a locally-stored copy of the synthetic 3D scene to produce a second set of rendered color samples; combining the first set of rendered color samples and the second set of rendered color samples to generate a combined set of color samples; and displaying the combined set of color samples.

In some embodiments, the second example method further includes receiving the synthetic 3D scene from the server and storing the received 3D scene as the locally stored copy.

In some embodiments, the second example method further includes sending, to the server, information indicating the viewpoint position.

In some embodiments, the second example method further includes sending, to the server, information indicating a requested sample density.

In some embodiments of the second example method, the synthetic scene comprises mesh information and surface texture information.

A third example method in accordance with some embodiments includes, at a server: generating a plurality of point cloud samples of a synthetic 3D scene, each of the point cloud samples having (i) a point location, (ii) at least one viewing direction, and (iii) color information for each of the viewing directions, wherein each point cloud sample is generated by a method comprising: selecting a point cloud location on a surface in the 3D scene; and for each at least one viewing direction, performing ray tracing in the 3D scene to determine color information for the respective viewing direction; and sending the point cloud samples to a client.

In some embodiments of the third example method, a number of point cloud samples is selected based on signaling from the client.

In some embodiments of the third example method, the at least one viewing direction is selected based on signaling from the client.

In some embodiments of the third example method, a number of viewing directions for a point cloud sample is based at least in part on a level of diffuseness of reflection at the corresponding surface, with the number of viewing directions being decreased for increasing diffuseness.

In some embodiments of the third example method, the synthetic scene comprises mesh information and surface texture information.

An example method for adaptive distributed ray trace rendering complexity between a client and server, in accordance with some embodiments, includes, at a client: requesting synthetic 3D content from a server; updating a viewpoint based on user input and tracking; determining a level of rendering assistance at the client to be requested from the server; signaling a current viewpoint, sampling density, angular resolution, and angular distribution to the server; receiving at the client, sparsely sampled directional point cloud data from the server; rendering the sparse directional point cloud samples to the current viewpoint at the client; producing sampling with local rendering to fill the gaps and dense sampling for a fovea area; de-noising an image buffer combining samples produced by the client and the server; and displaying the image buffer.

In some embodiments of the example method, the view is tracked, and the direction of gaze is used in selecting desired sampling density, viewpoint, angular resolution and angular viewpoint distribution.

In some embodiments of the example method, the server observes 3D scene surface properties and adjusts sampling accordingly.

In some embodiments of the example method, the client transmits a summary of rendering performance to the server.

In some embodiments of the example method, the server observes performance metrics and adjusts sampling density accordingly.

In some embodiments of the example method, the client detects gaps and occlusions in the sparse sampling caused by the motion parallax and filling in missing samples.

An example light field display method in accordance with some embodiments includes: determining a position of at least one object proximate to a light field display; determining a position of at least one viewer; selecting an augmentation for the object based at least in part on the relative positions of the object, the viewer, and a viewing volume of the light field display; and displaying the selected augmentation.

In some embodiments, a system comprises a processor and a non-transitory computer-readable storage medium storing instructions operative to perform any of the methods described above.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method comprising:
receiving from a server a plurality of point cloud samples of a synthetic 3D scene, the point cloud samples including (i) a point location, (ii) at least one viewing direction, and (iii) color information for each of the viewing directions;
based on a viewpoint position, obtaining a first set of color samples from the point cloud samples;

based on the viewpoint position, rendering at least a portion of a locally stored copy of the synthetic 3D scene to produce a second set of color samples; and causing display of the synthetic 3D scene using the first and second sets of color samples.

2. The method of claim 1, further comprising combining the first set of color samples and the second set of color samples to generate a combined set of color samples;

wherein causing display of the synthetic 3D scene comprises causing display of the combined set of color samples.

3. The method of claim 2, further comprising de-noising the combined set of color samples.

4. The method of claim 1, further comprising:

signaling to the server a requested sampling density;

wherein the point cloud samples are received with the requested sampling density.

5. The method of claim 4, further comprising selecting the requested sampling density based on a processing time for rendering the locally stored copy of the synthetic 3D scene.

6. The method of claim 1, further comprising receiving the copy of the synthetic 3D scene from the server, the locally stored copy of the synthetic 3D scene being the received copy of the synthetic 3D scene.

7. The method of claim 1, wherein the locally stored copy of the synthetic 3D scene comprises mesh information and surface texture information.

8. A method comprising:

generating a plurality of point cloud samples of a synthetic 3D scene, each of the point cloud samples having (i) a point location, (ii) at least one viewing direction, and (iii) color information for each of the viewing directions;

wherein the point cloud samples are generated by a method comprising:

selecting a point cloud location on a surface in the 3D scene; and for each at least one viewing direction, performing ray tracing in the 3D scene to determine color information for the respective viewing direction; and sending the point cloud samples to a client.

9. The method of claim 8, further comprising receiving a requested sample density from the client, wherein the point cloud samples are generated with the requested sample density.

10. The method of claim 8, wherein a number of viewing directions for a point cloud sample is based at least in part on a level of diffuseness of reflection at the corresponding surface, with the number of viewing directions being decreased for increasing diffuseness.

11. The method of claim 8, further comprising receiving from the client information indicating a viewpoint position, wherein the viewing directions are selected based on the viewpoint position.

12. The method of claim 8, further comprising sending a copy of the synthetic 3D scene to the client.

13. The method of claim 12, wherein the copy of the synthetic 3D scene comprises mesh information and surface texture information.

14. An apparatus comprising a processor configured to perform at least:

receiving from a server a plurality of point cloud samples of a synthetic 3D scene, the point cloud samples including (i) a point location, (ii) at least one viewing direction, and (iii) color information for each of the viewing directions;

based on a viewpoint position, obtaining a first set of color samples from the point cloud samples;

based on the viewpoint position, rendering at least a portion of a locally stored copy of the synthetic 3D scene to produce a second set of color samples; and causing display of the synthetic 3D scene using the first and second sets of color samples.

15. The apparatus of claim 14, wherein the processor is further configured to combine the first set of color samples and the second set of color samples to generate a combined set of color samples;

wherein causing display of the synthetic 3D scene comprises causing display of the combined set of color samples.

16. The apparatus of claim 14, wherein the processor is further configured to perform:

selecting a requested sampling density based on a processing time for rendering the locally stored copy of the synthetic 3D scene; and signaling to the server the requested sampling density;

wherein the point cloud samples are received with the requested sampling density.

17. The apparatus of claim 14, wherein the processor is further configured to receive the copy of the synthetic 3D scene from the server, the locally stored copy of the synthetic 3D scene being the received copy of the synthetic 3D scene.

18. The apparatus of claim 14, wherein the locally stored copy of the synthetic 3D scene comprises mesh information and surface texture information.

* * * * *